US009442678B2

(12) United States Patent
Kobayashi et al.

(10) Patent No.: US 9,442,678 B2
(45) Date of Patent: Sep. 13, 2016

(54) INFORMATION PROCESSING APPARATUS, INFORMATION PROCESSING SYSTEM AND NON-TRANSITORY COMPUTER-READABLE INFORMATION RECORDING MEDIUM

(71) Applicants: Hiroto Kobayashi, Saitama (JP); Daisuke Tamashima, Kanagawa (JP)

(72) Inventors: Hiroto Kobayashi, Saitama (JP); Daisuke Tamashima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/843,188

(22) Filed: Sep. 2, 2015

(65) Prior Publication Data
US 2016/0077777 A1 Mar. 17, 2016

(30) Foreign Application Priority Data

Sep. 12, 2014 (JP) .................................. 2014-186701

(51) Int. Cl.
*G06F 3/12* (2006.01)
*G06F 9/44* (2006.01)

(52) U.S. Cl.
CPC ........... *G06F 3/1205* (2013.01); *G06F 3/1254* (2013.01); *G06F 3/1285* (2013.01); *G06F 9/44* (2013.01)

(58) Field of Classification Search
CPC .. G06F 3/1205; G06F 3/1254; G06F 3/1285; G06F 9/44
USPC ............................ 358/1.1, 1.13, 1.14, 1.15
See application file for complete search history.

(56) References Cited

U.S. PATENT DOCUMENTS

| 7,525,682 | B2* | 4/2009 | Mori ..................... G06F 3/1205 358/1.1 |
| 8,760,680 | B2 | 6/2014 | Tamashima |
| 8,848,217 | B2 | 9/2014 | Kobayashi |
| 8,867,077 | B2 | 10/2014 | Kobayashi |
| 8,922,823 | B2 | 12/2014 | Tamashima |
| 8,953,214 | B2 | 2/2015 | Kobayashi |
| 8,976,386 | B2* | 3/2015 | Mukasa ............... G06F 3/1205 358/1.13 |
| 2010/0157362 | A1* | 6/2010 | Oomura ............... G06F 3/1204 358/1.15 |
| 2011/0058199 | A1 | 3/2011 | Kobayashi |
| 2011/0286036 | A1 | 11/2011 | Kobayashi |
| 2012/0140249 | A1 | 6/2012 | Tamashima |
| 2012/0140269 | A1 | 6/2012 | Kobayashi |
| 2013/0250331 | A1 | 9/2013 | Kobayashi |
| 2014/0063522 | A1 | 3/2014 | Kobayashi |

FOREIGN PATENT DOCUMENTS

| JP | 2005-148928 | 6/2005 |
| JP | 2013-088869 | 5/2013 |
| JP | 2013-196503 | 9/2013 |

\* cited by examiner

*Primary Examiner* — Allen H Nguyen
(74) *Attorney, Agent, or Firm* — Oblon, McClelland, Maier & Neustadt, L.L.P.

(57) ABSTRACT

An information processing apparatus includes a print data generation part that receives, via an operating system, a print execution instruction including a file and a first print setting from the application, and generates print data; an application management part that sends a printing instruction to the application; an extended interface part other than an interface part defined by the operating system; and a print setting storing part that stores a second print setting that is input from the application management part via the extended interface part. The print data generation part changes a print setting to be used to generate the print data from the first print setting to the second print setting.

14 Claims, 21 Drawing Sheets

FIG.12

PRINT SETTING

BASIC

CURRENT SETTING

PRINTING WAY:
[NORMAL PRINTING ▼] [▲ DETAILS OF PRINTING WAY...]

DOCUMENT SIZE:
[A4(210 × 297 mm) ▼]
[UNDEFINED SIZE...]

DOCUMENT ORIENTATION:
● LONGITUDINAL
○ LATERAL

PRINTING PAPER SIZE:
[SAME AS DOCUMENT SIZE ▼]

PAPER FEEDING TRAY:
[AUTOMATIC TRAY SELECTION ▼]
PAPER EJECTION DESTINATION:
[ACCORDING TO PRINTER'S SETTING ▼]

EDIT

N IN 1:
[NO ▼]

PAGE ARRANGEMENT:
[NO ▼]

☐ PAGE FRAME

DUPLEX:
☐ [NO ▼]

BOOK BINDING:
☐ [NO ▼]

FINISHING

STAPLING:
☐ [NO ▼]

PUNCHING:
☐ [NO ▼]

SORTING:
[SORTING OF PRINTER ▼]

COLOR/MONOCHROME:
[COLOR ▼]

NUMBER OF SHEETS: (1-99)
[1]

SETTING UNIT:
[FOR EACH APPLICATION ▼] — 501

APPLICATION NAME:
[AbobeReader ▼] — 502

[VERSION INFORMATION]  [OTHERS...]  [RETURN TO STANDARD]  [PRINTING QUALITY DETAILS...]

[OK]  [CANCEL]  [APPLY (A)]

500

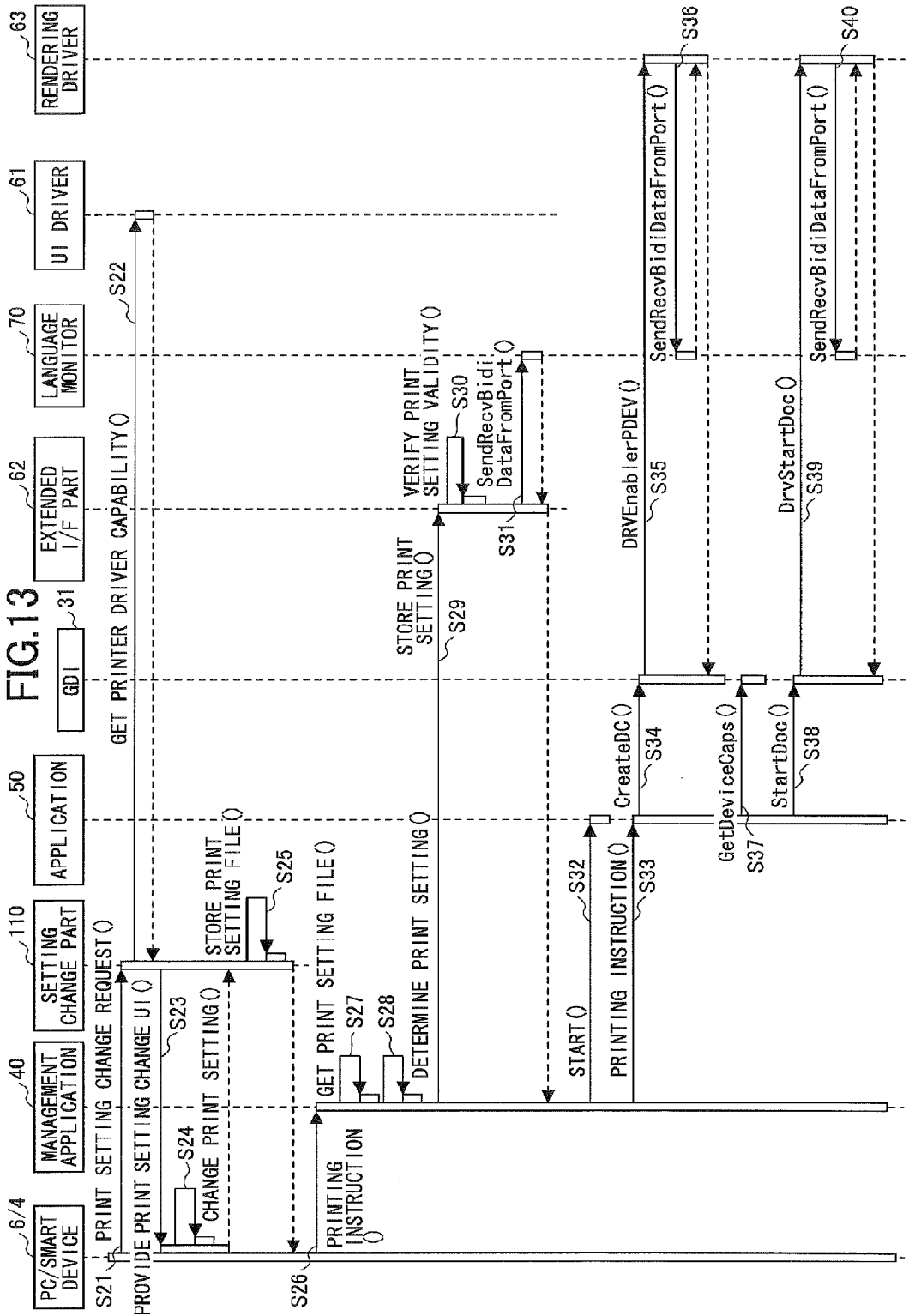

INFORMATION PROCESSING APPARATUS, INFORMATION PROCESSING SYSTEM AND NON-TRANSITORY COMPUTER-READABLE INFORMATION RECORDING MEDIUM

BACKGROUND OF THE INVENTION

1. Field of the Invention

The present invention relates to an information processing apparatus, an information processing system and a non-transitory computer-readable information recording medium.

2. Description of the Related Art

<Windows (Registered Trademark) Print Architecture>

FIG. 18 generally shows a Windows (registered trademark) print architecture. According to the Windows print architecture, when an application 50 outputs a print execution instruction, a printer driver 60 receives a DEVMODE structure 190 storing print settings, generates rendering data reflecting the print settings such as "N in 1" (a way of printing where a plurality of size-reduced pages is arranged on a sheet), duplex (a way of printing where two pages are printed on front and back sides of the same sheet, respectively), stapling, and/or the like, and transmits the rendering data to a printer 5 which then carries out printing according to the rendering data. The DEVMODE structure 190 is sent to a Graphics Device Interface (GDI) 31 of an Operating System (OS) when the application 50 thus outputs the print execution instruction, and then the DEVMODE structure 190 is sent to the printer driver 60.

As a result of the DEVMODE structure 190 being thus sent to the printer driver 60 from the application 50, the application 50 can output a rendering instruction to the GDI 31 while understanding the capability of the printer 5 such as the area to render and so forth. This is because, as shown in FIG. 18, the printer driver 60 returns the rendering capability (the information concerning the capability with which rendering can be carried out) to the GDI 31 based on the DEVMODE structure 190 that the printer drive 60 receives when receiving the print execution instruction and the information of the printer 5 that is the printing device to which the printer driver 60 itself is connected.

SUMMARY OF THE INVENTION

According to one embodiment of the present invention, an information processing apparatus includes a print data generation part that receives, via an operating system, a print execution instruction including a file and a first print setting from the application, and generates print data; an application management part that sends a printing instruction to the application; an extended interface part other than an interface part defined by the operating system; and a print setting storing part that stores a second print setting that is input from the application management part via the extended interface part. The print data generation part changes a print setting to be used to generate the print data from the first print setting to the second print setting.

Other objects, features and advantages of the present invention will become more apparent from the following detailed description when read in conjunction with the accompanying drawings.

BRIEF DESCRIPTION OF THE DRAWINGS

FIG. 12 illustrates one example of a print setting change UI provided by a setting change part shown in FIG. 11;

FIG. 13 is a sequence diagram illustrating a procedure from setting the print settings to generating the print data based on the second example;

DETAILED DESCRIPTION OF THE EMBODIMENTS

The embodiments relate to information processing apparatuses, information processing systems and non-transitory computer-readable recording media. More specifically, the embodiments relate to information processing apparatuses, information processing systems and non-transitory computer-readable recording media with each of which it is possible to change print settings in an application without modifying the application or inputting instructions to a print setting screen page.

Figure 18:
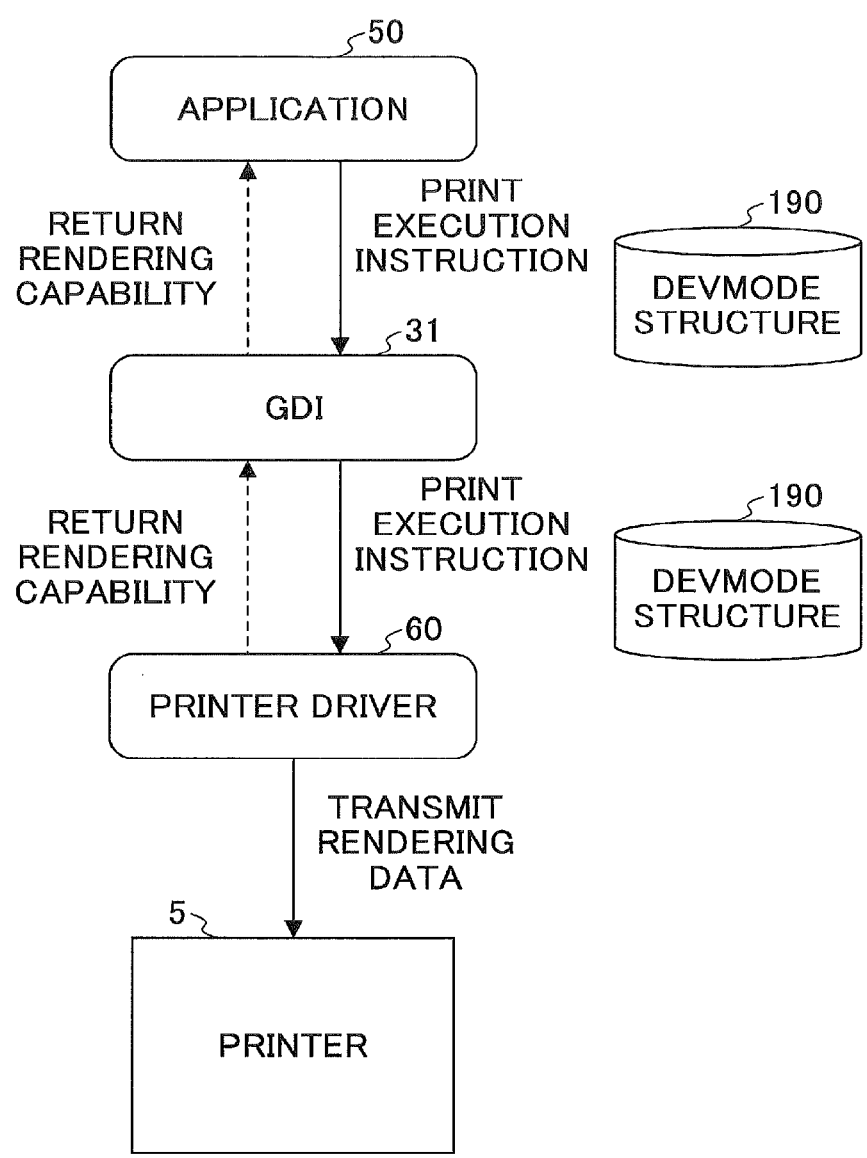
FIG. 18 generally illustrates the Windows print architecture.

Note that, according to the configuration of the Windows print architecture shown in FIG. 18, the application 50 can send the DEVMODE structure 190 to the printer driver 60 only when outputting the print execution instruction. Also, another application (another process) or another thread even in the same application (same process) cannot access the print settings used by the application 50 in the printing.

Further, the printer driver 60 can display a print setting screen page (also called a printing dialog) in a printer folder and determine the default print settings (the DEVMODE structure as a system default). These print settings can be acquired from the application via an Application Programming Interface (API).

At this time, the GDI 31 sends a print setting instruction to the printer driver 60 via a Device Drive Interface (DDI). Concerning the DDI, only an interface (I/F) is defined. Therefore, the manufacturer of the printer driver can design a way of implementing the inside of the DDI (a process of the printer driver carried out when being called via the DDI). However, even if the manufacturer uniquely defines the I/F, the Windows OS cannot know the I/F, and therefore, the I/F is not called.

<DEVMODE Structure>

Figure 19:
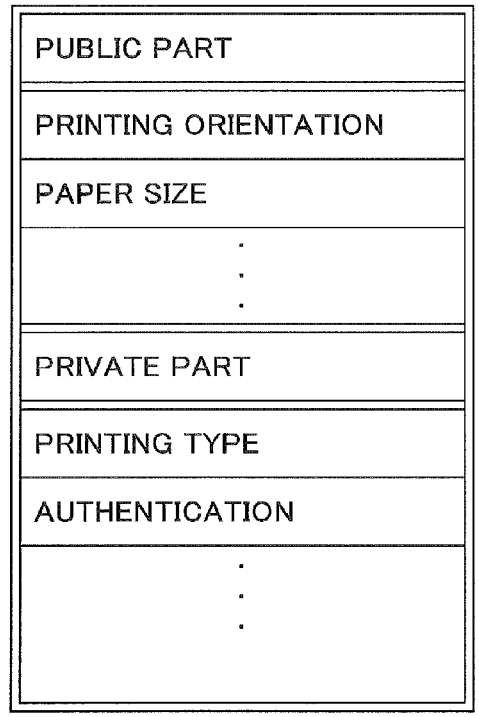
FIG. 19 illustrates one example of the DEVMODE structure.

FIG. 19 illustrates one example of the DEVMODE structure. As shown, the DEVMODE structure includes a Public part and a Private part. The Public part includes OS definitions, and therefore, can be changed from each application. The Public part includes items that every printer driver needs to set such as a "printing orientation", a "paper size", and so forth.

The Private part is unique to each manufacturer. Therefore, it is possible to define the information therein for each manufacturer or for each printer driver. An application and a Windows OS cannot know the information in the Private part. Therefore, only one way to change the Private part is changing the settings in the Private part that is displayed by a User Interface (UI) driver of the printer driver. The Private part includes the setting items of features unique to each manufacturer or each printer type such as a "printing type", an "authentication", and/or the like.

<Reading DEVMODE Structure>

Figure 20:
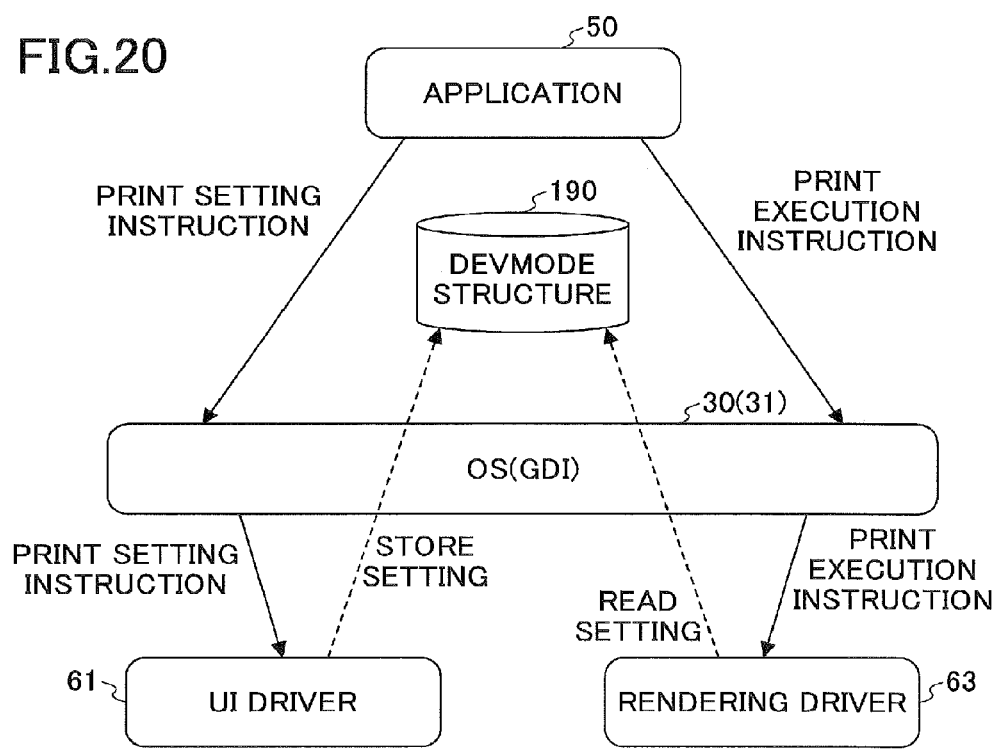
FIG. 20 illustrates reading the DEVMODE structure by a printer driver.

FIG. 20 illustrates reading the DEVMODE structure by the printer driver. The user sets the printing conditions (the print settings) such as paper size, the number of sheets of printing, duplex printing, and/or the like, displayed by the UI driver 61, and inputs the printing instruction. When the user thus inputs the print settings ("print setting instruction"), the application 50 generates a GDI call and sends the corresponding DEVMODE structure 190 to the GDI 31. The application 50 is, for example, a document creation program (for example, MS-Word (registered trademark)).

After acquiring the DEVMODE structure 190 from the application 50, the GDI 31 invokes a rendering driver 63 of the printer driver by using a DDI call, and sends the DEVMODE structure 190 ("print execution instruction") thereto. The rendering driver 63 reads the DEVMODE structure 190 thus acquired from the GDI 31 ("print setting instruction"), creates the print data reflecting the print settings based on the DEVMODE structure 190 and the document file received from the application 50 ("print execution instruction"), and sends the print data to a spooler. The print data includes the rendering data (for example, PDL data) and the control data (for example, PJL print commands).

Thus, each of the UI driver 61 and the rendering driver 63 can read the DEVMODE structure 190. The UI driver 61 can display the Private part of the DEVMODE structure 190, and receive a print setting change instruction.

Thus, the UI driver 61 stores the print settings in the DEVMODE structure 190, and the rendering driver 63 reads the print settings from the DEVMODE structure 190. The application 50 sends the DEVMODE structure 190 so that the print settings can be thus stored/read. Actually, the application 50 provides a memory, sends it to the UI driver 61 via the OS 30, and the UI driver 61 fills it. Also, when the application 50 outputs the print execution instruction via the OS 30, the rendering driver 63 reads the contents of the DEVMODE structure 190.

<Accessing DEVMODE Structure Using Extended I/F of Printer Driver>

Thus, in order to change the Private part of the DEVMODE structure 190, there is only a way that the printer driver 60 displays a print setting screen page and receives the user's operation. Thus, the user's operation is necessary.

However, there is a process desired to be completed automatically without the need of such user's operation. For example, a process of printing a spread sheet, a process of transmitting a Direct Mail (DM) via facsimile, or so, is such a case. For such a process, if the user is required to change the Private part of the DEVMODE structure 190 by inputting an instruction to the print setting screen page every time printing a spread sheet or transmitting a DM even using the same print settings, the controllability may be degraded.

Thus, there is a demand to be able to cause the application suitable to the process to change the print settings stored in the Private part of the DEVMODE structure 190 of the printer driver without the need of the user's operation.

In order to satisfy the demand, a manufacturer proposes an extended I/F of a printer driver such that an application can directly carry out communication with the printer driver (for example, see Japanese Laid-Open Patent Application No. 2005-148928). Also, depending on the user's request, an application suitable to the process is developed.

Figure 21:
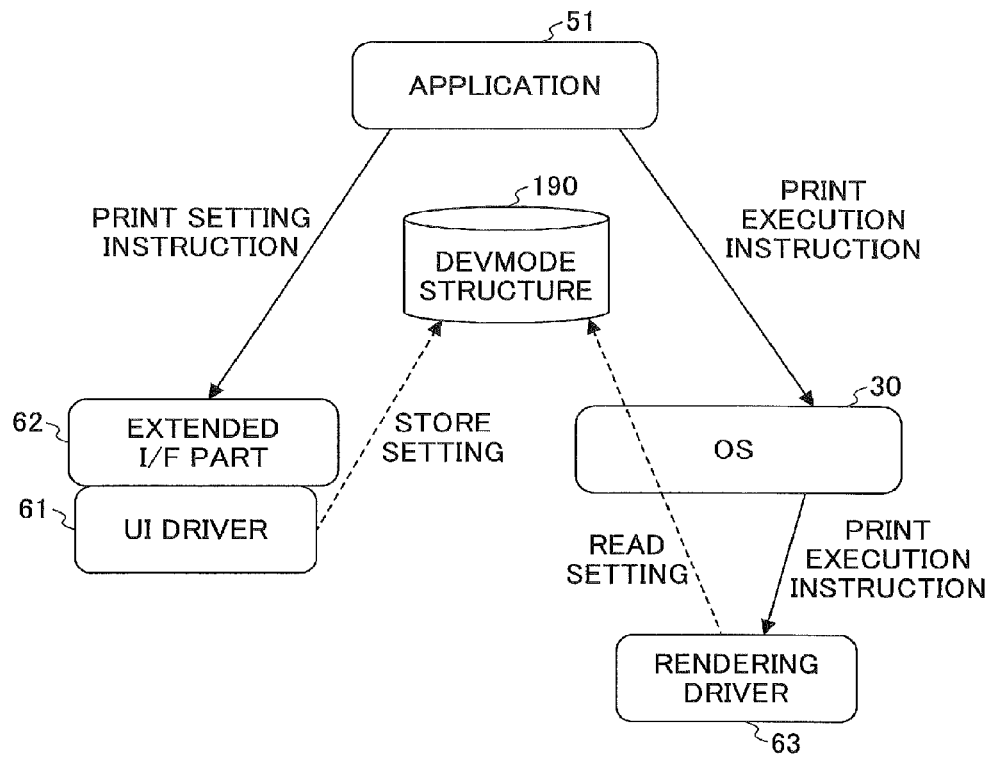
FIG. 21 illustrates an extended I/F part, an application and the DEVMODE structure.

FIG. 21 illustrates the extended I/F part, the application and the DEVMODE structure. The application 51 in FIG. 21 can invoke the application suitable to a process for the user, or at least the extended I/F part.

The application 51 can invoke the extended I/F part 62, send the print settings ("print setting instruction"), and change the print settings in the Private part of the DEVMODE structure 190 via the UI driver 61. The rendering driver 63 reads the print settings in the Private part of the DEVMODE structure 190 in response to the print execution instruction. Thus, after the user inputs the print execution instruction to the application 51, it is possible to complete the process without the need of the user's operation.

<RAW Spooling and EMF Spooling>

According to the Windows print architecture, printing by a printer driver can use two spooling types, i.e., a RAW spooling type and an EMF spooling type. According to the RAW spooling type, document data acquired by the printer driver from the application is converted into RAW data interpretable by the printer ("converting process"), during a process of the application. In this type, the user cannot operate the application until the converting process is finished.

According to the EMF spooling type, document data acquired by the OS from the application is converted into an EMF data format independent of the printer during a process of the application, and the EMF data is spooled ("spooler process"). Then, the printer driver converts the EMF data thus spooled in the spooler process into RAW data interpretable by the printer. In this type, the user can operate the application after the finish of converting the document data into the EMF data in the process of the application.

<Point & Print>

Next, a relationship between a type of installing a printer driver and the print settings after the start of printing will be described. Concerning the Windows printer driver, an installing type called "Point & Print" is available.

Figure 22:
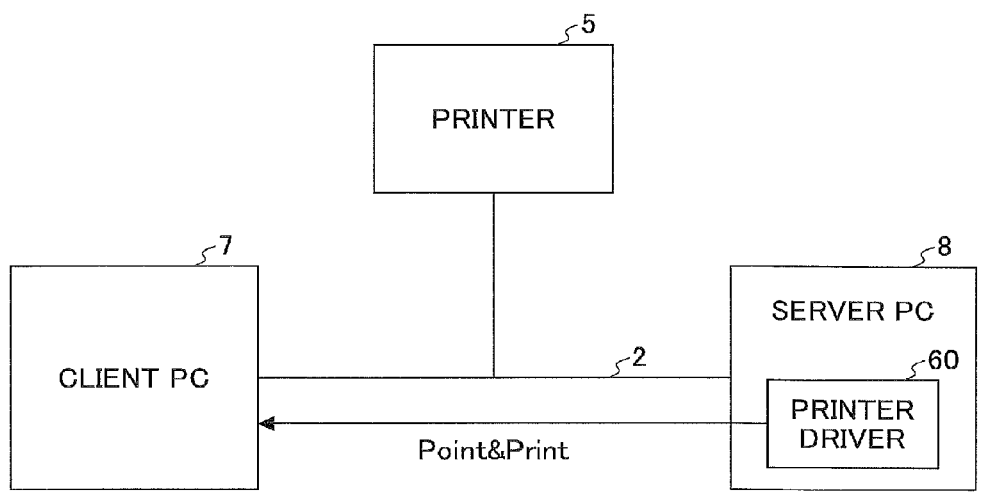
FIG. 22 generally illustrates the Point & Print technology.

FIG. 22 generally illustrates "Point & Print". A printer 5, a client PC 7 and a server PC 8 are connected to a communication network 2. An OS is installed in the client PC 7. Also, an OS (dedicated for a server) is installed in the server PC 8. The client PC 7 can make a printing request to the printer 5 using the server PC 8 as a print server.

In such a system, the same printer driver 60 as that of the server PC 8 needs to be installed in the client PC 7. However, considerable time and labor may be required of the administrator or so to install the printer driver in each client PC 7 connected to the communication network 2.

In order to improve this circumstance, downloading and installing the printer driver from the server PC 8 to the client PC 7 is enabled according to the Point & Print technology. This is enabled according to the Windows standard function. Note that also the printer driver 60 thus installed according to the Point & Print technology can use the RAW spooling type and the EMF spooling type in a printing process.

In case of the printer driver 60 thus installed according to the Point & Print technology (in case of the EMF spooling type), the user can change the PC which carries out rendering (through the rendering driver 63) between the client PC 7 and the server PC 8. Rendering by the client PC 7 is called "client-side rendering" whereas rendering by the server PC 8 is called "server-side rendering".

<Solution of Monitoring Shared Folder and Printing>

Figure 23:
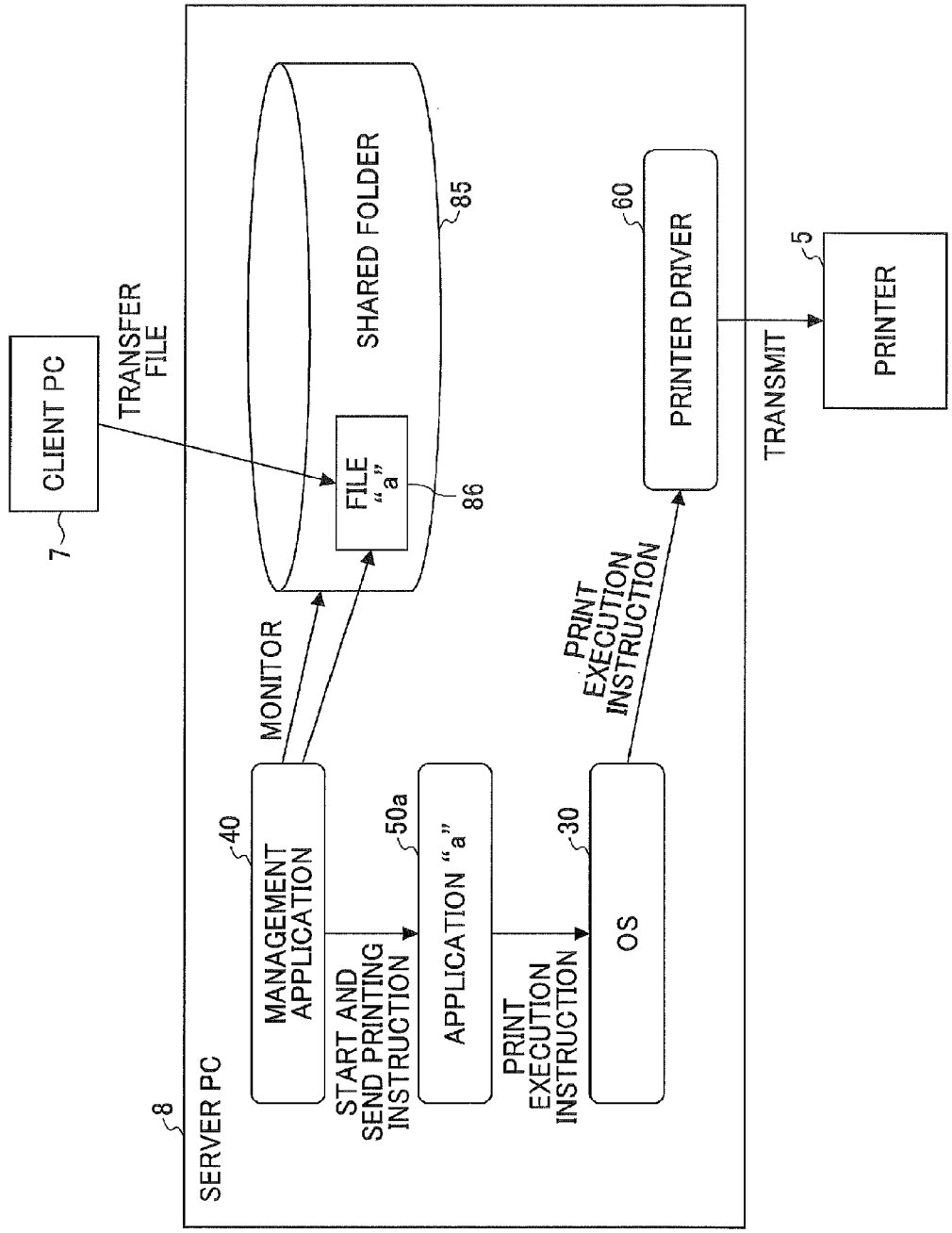
FIG. 23 illustrates the IT-BOX technology.

There is such a solution called "IT-BOX" that a shared folder is monitored, and printing is carried out after an added file is detected there. FIG. 23 illustrates the IT-BOX technology.

The IT-BOX technology is implemented using the Windows OS. A server PC 8 where the IT-BOX technology is employed has a management application 40 and a shared folder 85. The management application 40 monitors the shared folder 85. When detecting that a file is added there, the management application 40 starts an application which can output a print execution instruction for the added file to the OS and thus prints the file.

In FIG. 23, the management application 40 detects that the client PC 7 adds a file "a" 86 in the shared folder 85, reads the file "a" 86, starts an application "a" 50a which can output a print execution instruction for the file "a" 86 to the OS 30, sends the file "a" 86 to the application "a" 50a, and outputs a printing instruction thereto. If the file "a" 86 is, for example, a "doc." file, Word Viewer or MS-Word is used as the application "a" 50a.

As a result of the application "a" 50a outputting a print execution instruction to the OS 30, the OS outputting a print execution instruction to the printer driver 60 and the printer driver 60 transmitting rendering data to the printer 5, the printer 5 prints the file.

In each of almost all of Office applications, this IT-BOX solution is implemented using such a function that a file can be printed by giving the file with an argument to the Office application. According to the IT-BOX technology, it is possible that an external PC or smart device finds a file added to the shared folder 85, and prints the file through the printer 5. The type of installing the printer driver 60 in the IT-BOX technology may be different depending on each particular customer environment.

The IT-BOX technology can be improved in consideration of a situation where, when the printer driver 60 is used to carry out printing, the print settings in the application "a" 50a cannot be changed, and thus, the printing is carried out with the default print settings.

That is, the management application 40 is a unique application of a vendor who develops solutions. In contrast thereto, the Office application (50a) which is used to print an Office document or so is an application developed by another vendor or so. As a result, the Office application is not modified or cannot be modified. The management application 40 can output an Office file and a printing instruction to the Office application, only using an argument. Therefore, it is not possible to change the print settings.

Therefore, the user of another PC or smart device cannot print a file (after it is transferred to the shared folder 85) according to the desired print settings such as "N in 1", duplex, or so, from the PC or the smart device.

In the above-described case of the printer driver (according to Japanese Laid-Open Patent Application No. 2005-148928) using the extended I/F part 62 to be able to access the DEVMODE structure, it is a presupposition to store all the setting items in the DEVMODE structure. Therefore, the application that actually sends a print execution instruction to the printer driver needs to know the unique extended I/F part 62 of the printer driver. Therefore, in case of the IT-BOX solution or so where the application (the management application 40) which sends a trigger to start printing is different from the application (50a) which actually sends a print execution instruction to the printer driver, it is not possible to change the print settings.

A reason why it is a presupposition to store all the setting items in the DEVMODE structure according to the printer driver disclosed by Japanese Laid-Open Patent Application No. 2005-148928 will now be described. As shown in FIG. 21, when the application 51 changes the print settings using the extended I/F part 62 uniquely extended from the printer driver, the following processes (i), (ii) and (iii) are required.

(i) The application 51 inputs the DEVMODE structure 190 to the extended I/F part 62 of the printer driver.

(ii) The application 51 receives the DEVMODE structure 190, having the print settings therein changed, as an output.

(iii) The application 51 uses the received DEVMODE structure 190 as the DEVMODE structure 190 to be sent to the rendering driver 63 for starting the printing.

In other words, when using the extended I/F part 62, even if the print settings other than the DEVMODE structure 190 are stored, the application 51 cannot acquire the print settings other than the DEVMODE structure 190 from the extended I/F part 62. This is the reason why all the print settings need to be stored in the DEVMODE structure 190.

Also, according to the printer driver disclosed by Japanese Laid-Open Patent Application No. 2005-148928, it is necessary to modify the application into one suitable to the user's process or one that can invoke the extended I/F part 62.

Also, the printer driver disclosed by Japanese Laid-Open Patent Application No. 2005-148928 may have such a problem that it cannot work in the same way, not only in case of a specific spooling type or a case of being installed in a local environment, but also in both the RAW spooling type and the EMF spooling type. Also, when the printer driver is installed according to the Point & Print technology, it cannot work.

<Storing Print Settings in File or Registry Other than DEVMODE Structure>

There is also a printer driver which executes such a method that the print settings are stored in a file, a registry, a shared memory space, or so, other than the DEVMODE structure. The printer driver then reads the thus stored print settings, and as a result, the print settings can be changed from the outside.

Figure 24:
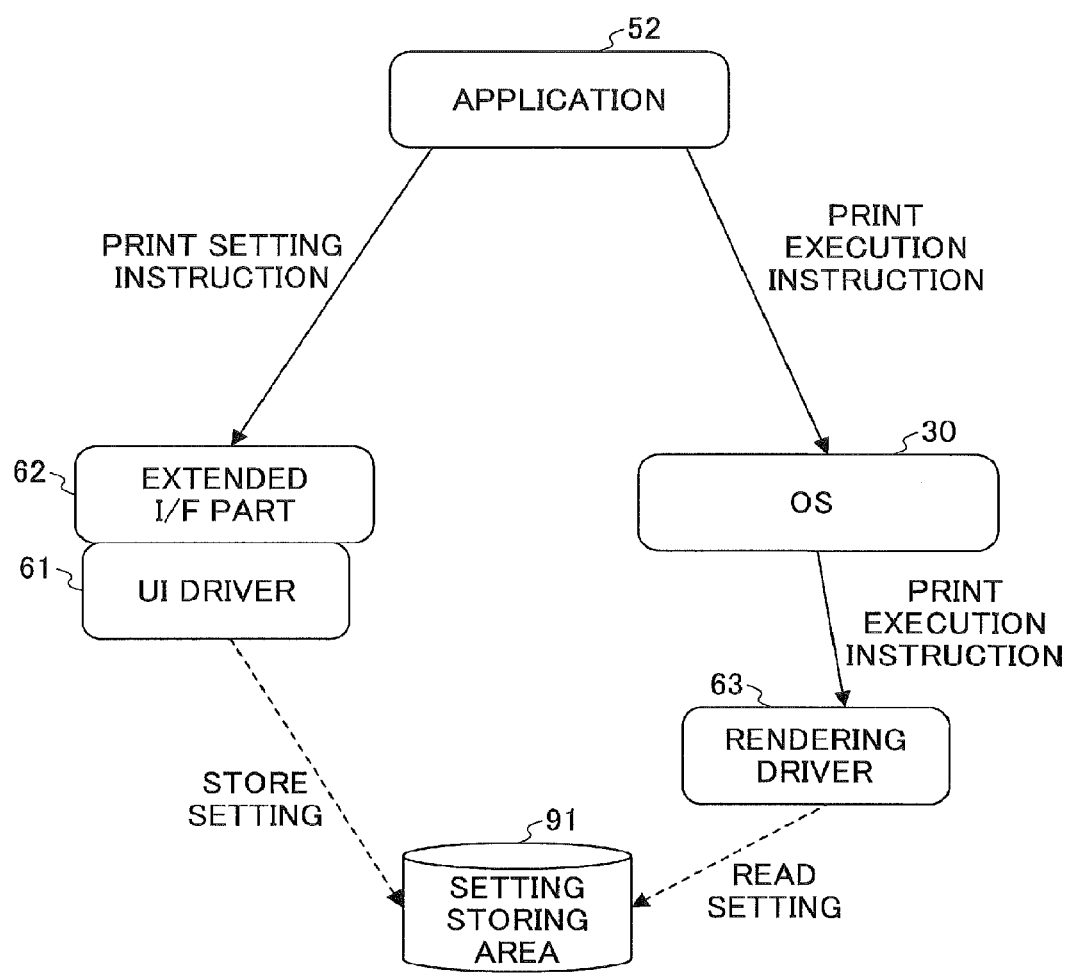
FIG. 24 illustrates a method of enabling a change of the print settings from the outside by storing the print settings in a file, a registry, a shared memory space, or so, other than the DEVMODE structure, and reading them by a printer driver.

FIG. 24 shows one example of this method. As shown, the application 52 invokes the extended I/F part 62, sends a print setting instruction thereto, and stores the print settings in a setting storing area 91 other than the DEVMODE structure via the UI driver 61. The rendering driver 63 then reads the print settings from the setting storing area 91 in response to a print execution instruction from the OS 30.

According to this method, the above-described problem is solved with regard to the point that the print settings are not stored in the DEVMODE structure. However, other problems may occur due to not using the DEVMODE structure, in the following two cases 1 and 2:

1. a printing sequence in the EMF spooling type
2. a printing sequence by the printer driver installed according to the Point & Print technology In the case 1, the above-mentioned method depends on a DDI call sequence at a time of printing, and can be implemented in case of the RAW spooling type. However, if the spooling type is different, the DDI call sequence of being invoked from the OS is changed. That is, the EMF spooling type requires two times of converting process sequences inside the OS, i.e., the process of converting print data acquired from the application into the EMF data, and the process of converting the EMF data into the data interpretable by the printer.

Between these two times of converting process sequences, the process of converting the print data acquired from the application into the EMF data and the process of converting the EMF data into the data interpretable by the printer are mutually different processes. Whether access is permitted or inhibited depends on the authority of each process. Therefore, depending on the place of the file or the registry, there is a case where the print settings that have been previously set via the extended I/F part 62 cannot be acquired from the setting storing area 91 when the EMF data is finally converted into the data interpretable by the printer. In fact, according to the recent Windows OS, from the security viewpoint, there is a case where access is completely impossible if the authority is different.

In the case 2, the above-mentioned method can be implemented when the printer driver is installed in a PC used by the user in a local environment. However, there is a case where the above-mentioned method cannot be implemented when the printer driver is installed according to the Point & Print technology.

That is, in the driver installed according to the Point & Print technology, it is possible that the place where the UI driver 61 works and the place where the rendering driver 63 works are mutually different. For example, according to "client-side rendering", the UI driver 61 and the rendering driver 63 work in the client PC 7, whereas, according to "server-side rendering", the UI driver 61 works in the client PC 7 while the rendering driver 63 works in the server PC 8.

In "server-side rendering", the PCs where the respective drivers 61 and 63 work are physically different from one another. Therefore, the print settings temporarily stored in the setting storing area 91 such as a file or a registry by the extended I/F part 62 of the printer driver 60 cannot be acquired by the rendering driver 63 when the EMF data is finally converted into the data interpretable by the printer.

The embodiments have been devised for the purpose of solving these possible problems, and an object is to be able to change the print settings in the application without modifying the application that outputs the print execution instruction to the operating system and without the need of the user's operation of the print setting screen page.

Below, the embodiments of the present invention will be described using the accompanying drawings. Note that, in the drawings described now, the same reference numerals are given to the same or corresponding elements as those of the drawings described above.

<General Configuration of Printing System>

Figure 1:
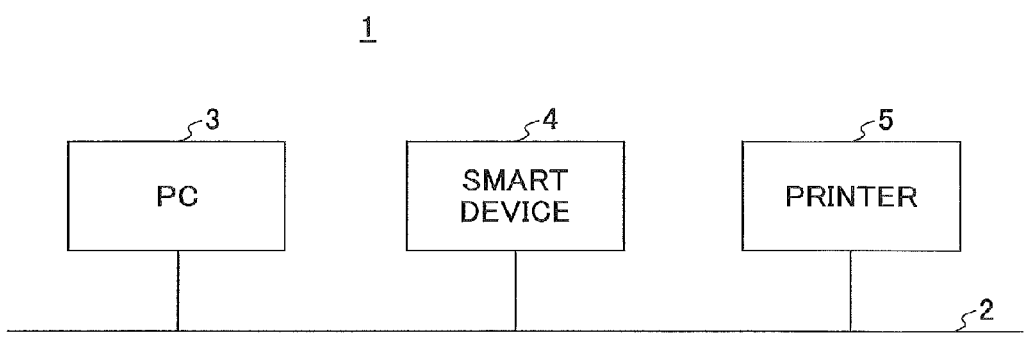
FIG. 1 generally shows a printing system including an information processing apparatus according to one embodiment.

FIG. 1 generally shows a printing system including an information processing apparatus according to one embodiment.

The printing system 1 includes a PC 3, a smart device 4 and a printer 5, each thereof being connected to a communication network 2. The PC 3 corresponds to an "information processing apparatus", and the above-described IT-BOX technology is employed therein.

The PC 3 receives the user's operation, generates the print data by using a printer driver from a file created by an application such as a document creation software, and transmits the print data to the printer 5 via the communication network 2. Thus, it is possible to print the file. The smart device 4 can use the IT-BOX technology employed in the PC 3 via the communication network 2. The printer 5 includes an image formation part of an inkjet type or an electrophotographic type, and can be a multifunction peripheral.

<PC Hardware Configuration>

Figure 2:
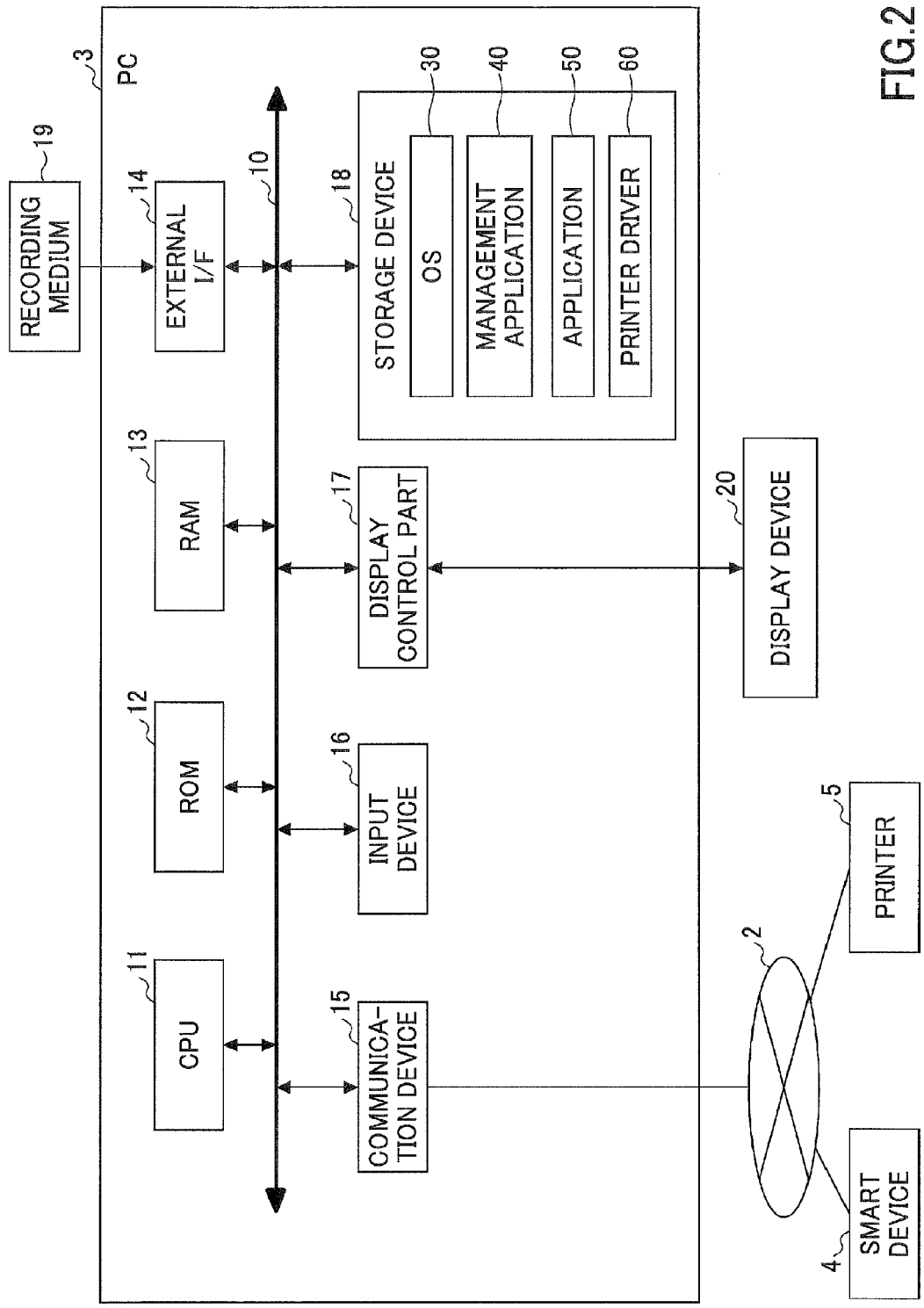
FIG. 2 illustrates a hardware configuration of a Personal Computer (PC) shown in FIG. 1.

FIG. 2 illustrates a hardware configuration of the PC 3 shown in FIG. 1.

The PC 3 includes a CPU 11, a ROM 12, a RAM 13, an external I/F 14, a communication device 15, an input device 16, a display control part 17 and a storage device 18, each thereof being mutually connected together via a bus 10.

The CPU 11 reads an OS 30, a management application 40, an application 50 and a printer driver 60 from the storage device 18, and executes various processes using the RAM 13 as a work memory.

The ROM 12 stores a BIOS, data that is initially set, a start program, and so forth. The RAM 13 is a work memory (main memory) temporarily storing necessary data.

The external I/F 14 is an interface to which a cable such as a USB cable, a portable recording medium 19, or so, is connected/loaded. The communication device 15 is a LAN card, an Ethernet (registered trademark) card, or so, and transmits packet data (that is mainly the print data in the embodiments) to the printer 5 in response to an instruction from the CPU 11.

The input device 16 is a user interface receiving various operation instructions of the user, such as a keyboard, a mouse, and/or the like. It is also possible that a touch panel, a voice input device, or so, can be used as the input device 16.

The display control part 17 controls "rendering" on the display device 20 with the predetermined resolution, number of colors, and so forth, based on screen page information that is sent from the application 50 as instructions. The display device 20 is a Flat Panel Display (FPD) such as a liquid crystal device, an organic EL device, or so.

The storage device 18 is a nonvolatile memory such as a Hard Disk Drive (HDD), a flash memory, or so, and stores the OS 30, the management application 40, the application 50 and the printer driver 60. Also, the storage device 18 includes a "shared folder" (not shown in FIG. 2). The recording medium 19 is, for example, a nonvolatile memory such as a SD card, a USB memory, or so.

The OS 30 can be the Windows OS. Note that, as the OS 30, although the Windows OS is preferable, it is also possible to use an OS having the equivalent functions as those of the Windows OS.

The application 50 can be any application as long as it can create, edit, display, manage, and so forth, document data, and can carry out a printing process of the document data. For example, any one of various applications such as a document creation software, a document viewing software (a document viewer, a document reader, or so), a browser software, a presentation material creation software, and so forth, can be used as the application 50. Note that, the document data can include not only characters/letters, signs, marks, numerical values, and so forth, but also data of various image formats (for example, JPEG, TIFF, and so forth).

The management application 40, the printer driver 60 and the shared folder will be described later in detail.

<PC Software Configuration>

Figure 3:
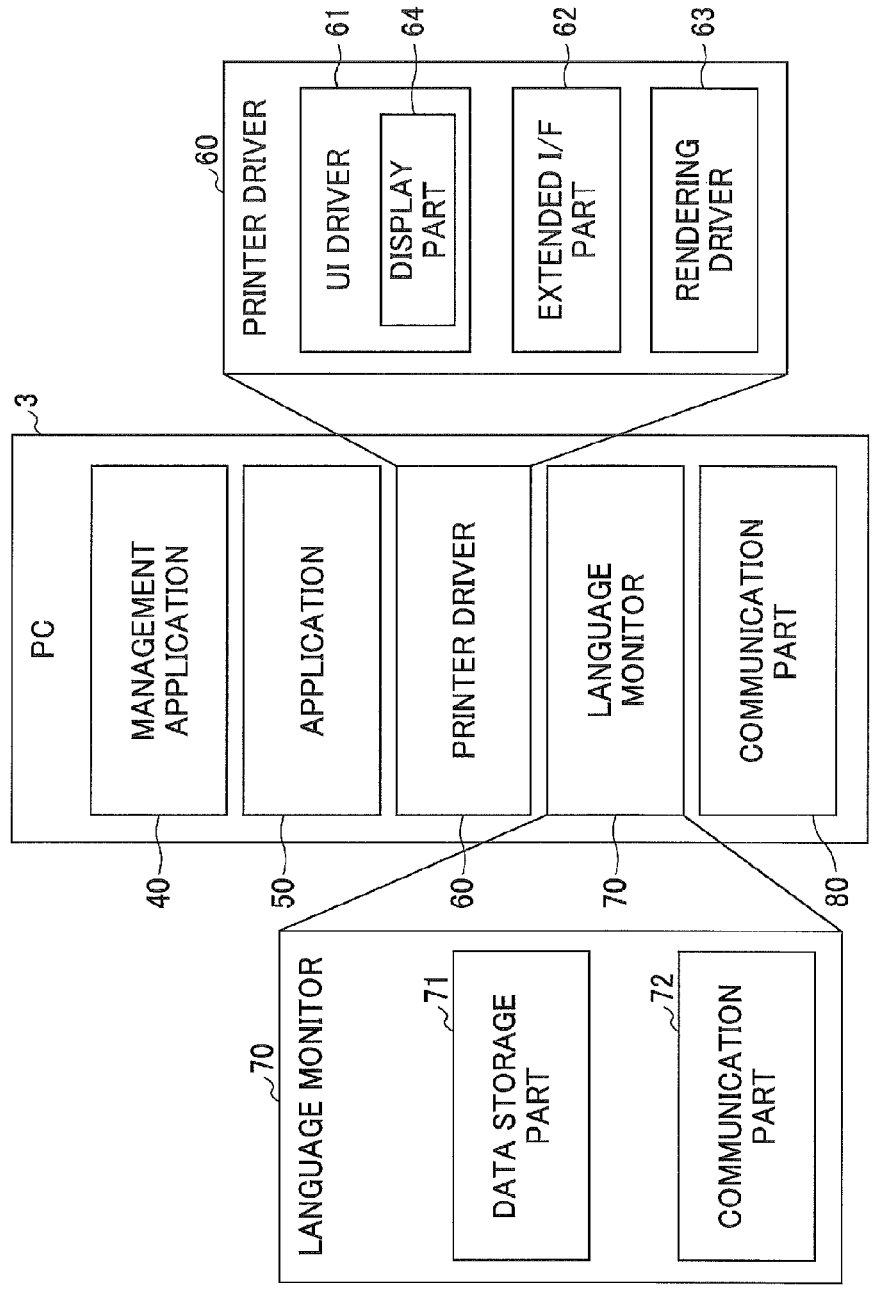
FIG. 3 illustrates a software configuration of the PC shown in FIG. 1.

FIG. 3 illustrates a software configuration of the PC 3 shown in FIG. 1, i.e., the software stored by the storage device 18.

The PC 3 includes the management application 40, the application 50, the printer driver 60, a language monitor 70 and a communication part 80. Thereamong, the language monitor 70 is provided by the Windows OS 30 as a bidirectional communication interface part (software) for bidirectional communication between the printer driver 60 and the printer 5 (a printing device). Therefore, the language monitor 70 is a part of the OS 30 in a broad sense. Although other elements such as a GDI, a spooler, a printer processor, and so forth, have been omitted from the description, also they are installed in the PC 3 together with the OS 30.

The management application 40 is a program for monitoring the shared folder as a shared storage area, and, when detecting that a file is added to the shared folder, starting the application 50 which can carry out a printing process of the added file (i.e., sending the print execution instruction to the OS, and so forth), giving the added file to the started application, and causing the application to carry out the printing process. The management application 40 functions both as an application management part (unit) and as a monitoring part (unit).

The printer driver 60 includes a UI driver 61, an extended I/F part 62 and a rendering driver 63. The UI driver 61 has a display part 64. The display part 64 of the UI driver 61 displays a print setting screen page on the display device 20 as a result of the user inputting a printing operation to the application 50.

The user is then allowed to input the print settings from the print setting screen page such as the number of sheets of printing, duplex, "N in 1", "book binding", "change in size" (or zoom in/out), and/or the like. Even after the user inputs a printing start instruction, the display part 64 can receive a change in the print settings while displaying the print setting screen page on the display device 20. The print settings are stored in a structure (a data table) called the DEVMODE structure. The DEVMODE structure is a data structure where member variables are defined for setting various printing conditions in common for various printer drivers 60 that operate under the control of the Windows OS. The DEVMODE structure is sent to the printer driver 60 via the GDI that is an interface part defined by the OS 30.

The extended I/F part 62 is an interface unique to the printer driver 60 enabling direct reception of the print settings without using the DEVMODE structure. In other words, the extended I/F part 62 is an extended interface other than interface parts defined by the OS 30. The extended I/F part 62 receives the print settings of the application 50 from the management application 40. The language monitor 70, as a print setting storing part (unit), stores the print settings.

The rendering driver 63 as a print data generation part (unit) reads the print setting stored by the DEVMODE structure and the print settings stored by the language monitor 70, and creates the print data based on a document file concerning the print execution instruction sent from the application 50, the print data reflecting the print settings. At this time, if the language monitor 70 stores the print settings, these print setting are used. If the language monitor 70 stores no print settings, the print settings stored by the DEVMODE structure are used. Thus, the print settings stored by the language monitor 70 are preferentially used.

The language monitor 70 has a data storage part 71 and a communication part 72. Thereamong, the communication part 72 carries out communication control as the Windows print architecture when the printer driver 60 transmits the print data to the communication part 80. The communication part 72 is included in a language monitor of the related art as a bidirectional communication interface that is a standard part for the Windows OS. The communication part 72 can receive also a message from the printer 5 via the communication part 80.

In contrast thereto, the data storage part 71 is unique to the embodiments, and stores the print settings that are input from the extended I/F part 62. The data storage part 71 is implemented by the printer driver 60 using a function of a language monitor of the prior art. Therefore, it is not necessary to modify the Windows OS 30 or, it may be necessary to only slightly modify the Windows OS 30 if any. The data storage part 71 will be described later in detail.

The communication part 80 carries out communication with the smart device 4 and the printer 5 connected to the communication network 2, and executes a communication process according to a protocol such as TCP/IP.

Note that, in FIG. 3, the extended I/F part 62 is separate from the UI driver 61. However, the UI driver 61 can include the extended I/F part 62.

<Relationships Between Management Application, Application, Printer Driver and OS>

Figure 4:
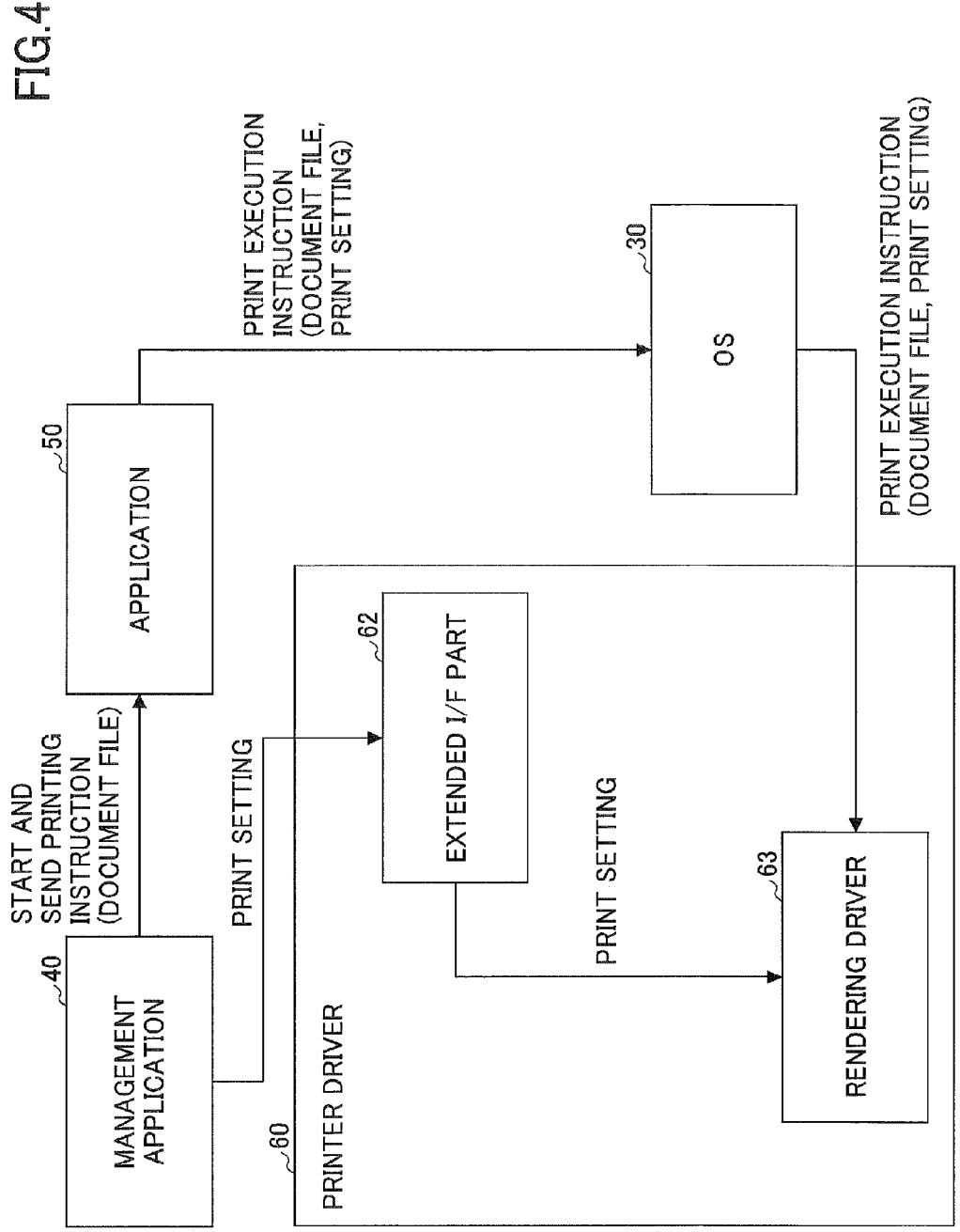
FIG. 4 illustrates relationships between a management application, an application, a printer driver and an OS shown in FIG. 3.

FIG. 4 illustrates relationships between the management application 40, the application 50, the printer driver 60 and the OS 30.

As a result of the management application 40 using the extended I/F part 62 of the printer driver 60, it is possible to send the print settings of the application 50 to the printer driver 60. Only as a result of being started by the management application 40 and receiving the document file to be printed, the application 50 can output the print execution instruction together with the document file and the print settings to the OS 30. Even if the application 50 sends the default print settings ("first print setting") to the OS 30, it is possible to implement the printing reflecting the intention of the user of the smart device 4 as a result of the rendering driver 63 reading the print settings ("second print setting") sent by the management application 40 via the extended I/F part 62.

<Basic Operations of Respective Software Elements>

Figure 5:
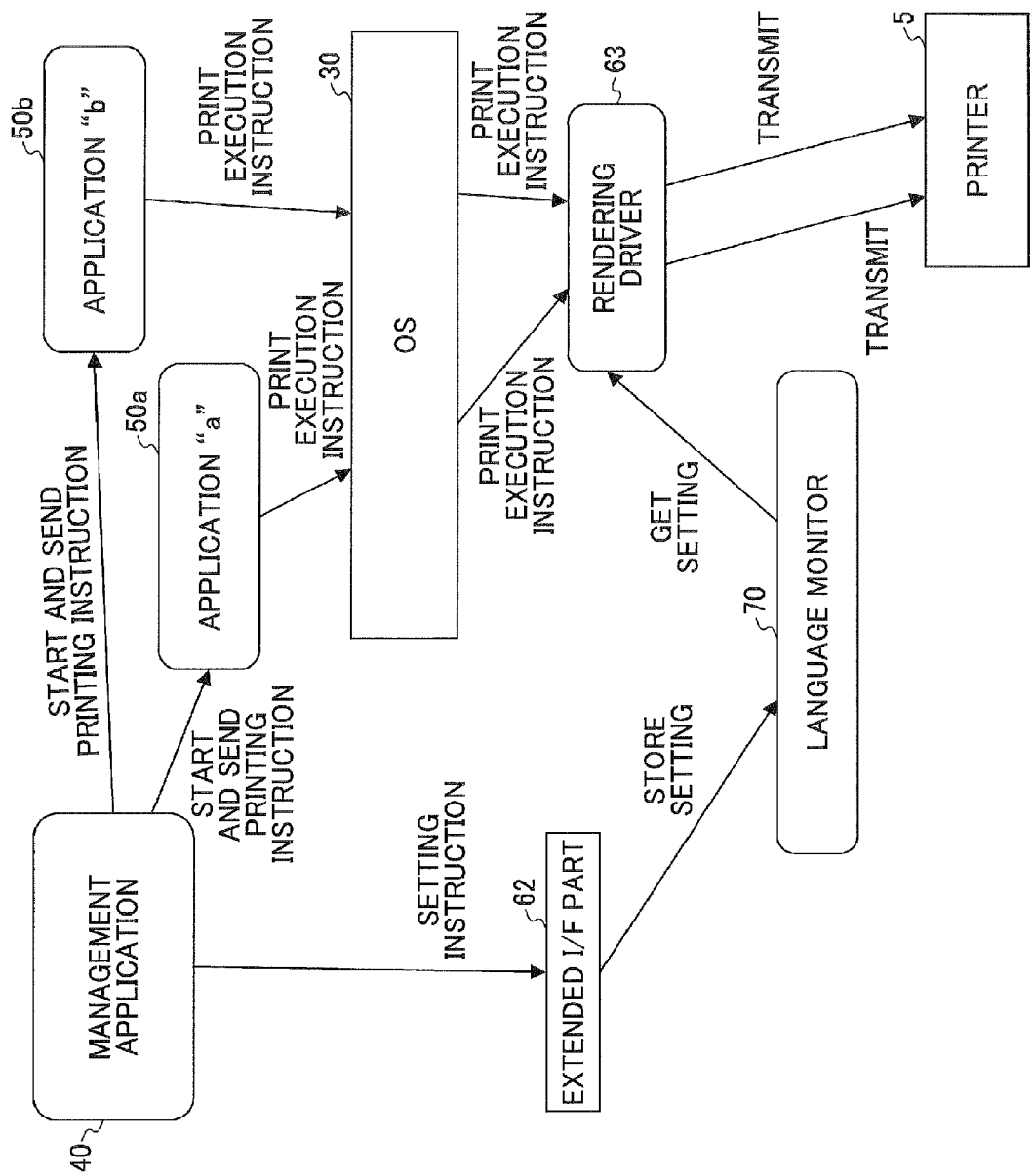
FIG. 5 illustrates basic operations of respective software elements shown in FIG. 3.

FIG. 5 illustrates basic operations of the respective software elements shown in FIG. 3.

The management application 40 outputs a setting instruction including the print settings to the extended I/F part 62 of the printer driver, and the extended I/F part 62 stores the print settings in the language monitor 70. The print settings which the management application 40 thus sets in the extended I/F part 62 can be those acquired from any device as long as they can be known by the management application 40, such as the print settings that are set by an external device (for example, the smart device 4) to the management application 40, the print settings stored at a specific path, the fixed values, or so.

The management application 40 selects the application 50 for each document file to be printed, starts the selected application 50, sends the document file thereto and sends a printing instruction thereto. In the example of FIG. 5, the management application 40 outputs printing instructions to the application "a" 50a and the application "b" 50b. The document files to be printed are, for example, designated by the user from the smart device 4 (not shown in FIG. 5).

The application "a" 50a and the application "b" 50b then output print execution instructions with the default print settings ("first print setting"), as they are, to the OS 30. The OS 30 then outputs the print execution instructions to the rendering driver 63.

The rendering driver 63 receives the print execution instructions together the default print settings "DEVMODE" ("first print setting"). Next, the rendering driver 63 queries the language monitor 70 whether the language monitor stores the print settings ("second print setting") that are set by the extended I/F part 62. If the language monitor 70 stores the print settings ("second print setting"), the rendering driver 63 acquires the print settings ("second print setting"). If the rendering driver 63 thus acquires the print settings ("second print setting") from the language monitor 70, the rendering driver 63 generates the print data reflecting the print settings ("second print setting"), and transmits the print data to the printer 5. If the rendering driver 63 acquires no print settings from the language monitor 70, the rendering driver 63 generates the print data reflecting the default print settings ("first print setting") stored by the DEVMODE structure, and transmits the print data to the printer 5.

<Storing Print Settings for Plurality of Logical Printers>

A plurality of logical printers can be registered in a single PC. "Logical printers" mean those displayed as icons of printers in a printer folder of the Windows OS. The Windows OS can create a plurality of logical printers for a single printer driver. The logical printers can be said as "virtual output destinations" of an application. The print data acquired through a rendering operation of a printer driver is output to a logical printer designated by the user, and is provided by the Windows OS from the logical printer to a physical printer.

For each logical printer, a single name can be given. The user or so can freely give the name, the name can be automatically given as a package name of the printer driver, or so. For each logical printer, it is possible to set a function, whether it is shared, a spooling type, options, and so forth. That is, it is possible to change the initial settings of the single physical printer.

When a plurality of logical printers are registered in a single PC, it is possible to improve the convenience of the user if the print settings can be changed for each of the logical printers. For this purpose, it is preferable that the print settings can be stored for each of the logical printers. In this case, the extended I/F part 62 registers the print settings in the language monitor 70 by using "logical printer names" as keys. In other words, the print settings are registered in association with "logical printer names".

Figure 6:
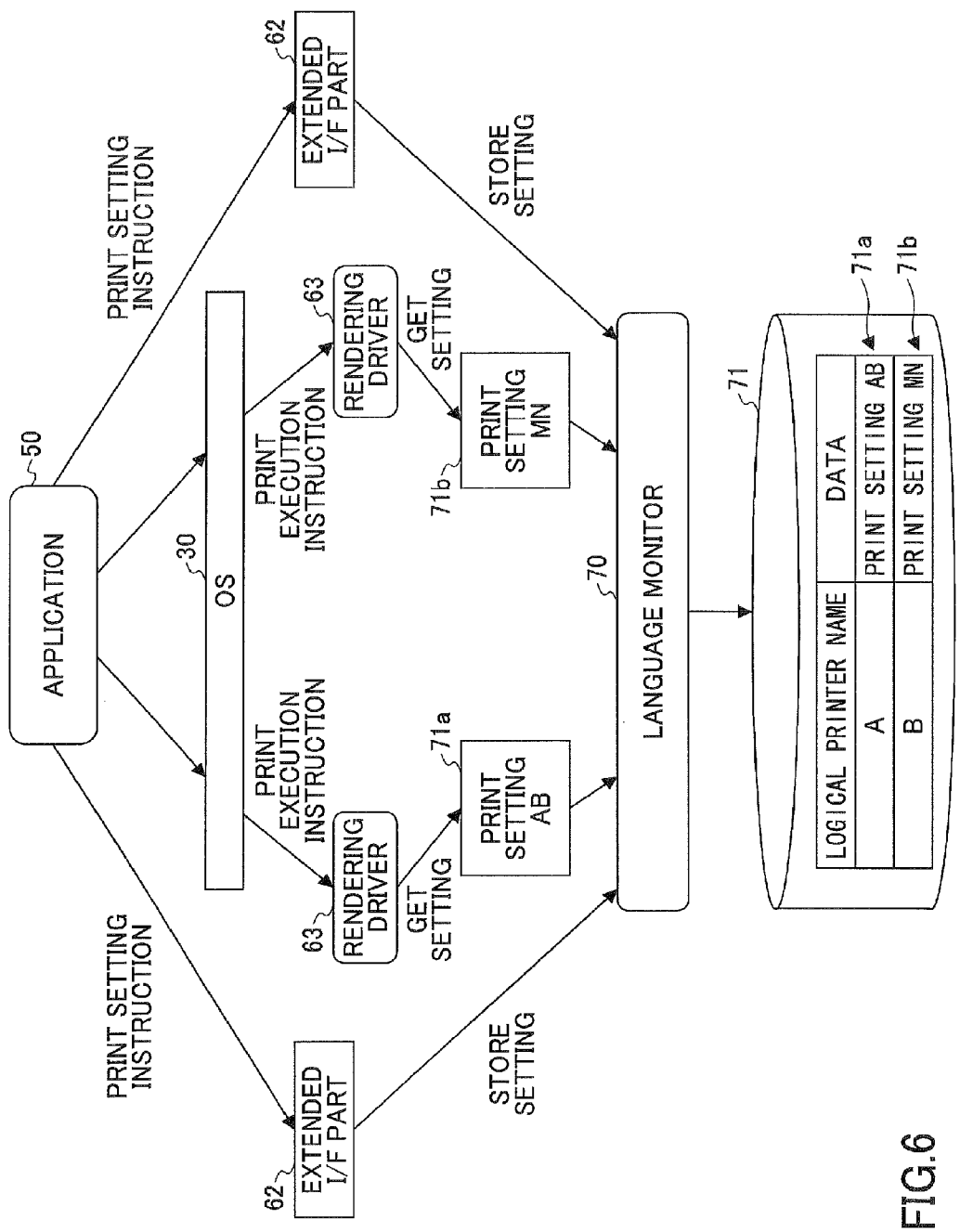
FIG. 6 illustrates a configuration for storing the print settings for a plurality of logical printers.

FIG. 6 illustrates a configuration for storing the print settings for a plurality of logical printers. FIG. 6 shows an example where the application 50 uses the extended I/F part 62 of the printer driver. In a data storage part 71 of the language monitor 70, the following print settings 71a and 71b are stored.

The print setting 71a: The application 50 sets the print settings AB for a logical printer name=A.

The print setting 71b: The application 50 sets the print settings MN for a logical printer name=B.

The logical printer names are IDs of the logical printers designated as output destinations by the user. Thus, the UI driver 61 and the rendering driver 63 can know the logical printer names to refer to. Therefore, it is possible to acquire the corresponding print setting by querying the language monitor 70 by the logical printer name. Similarly, also the extended I/F part 62 works according to the designation of the logical printer name. Therefore, the extended I/F part 62 can store the corresponding setting data in the language monitor 70 by using the logical printer name.

<First Example of Printing by Using IT-BOX>

Figure 7:
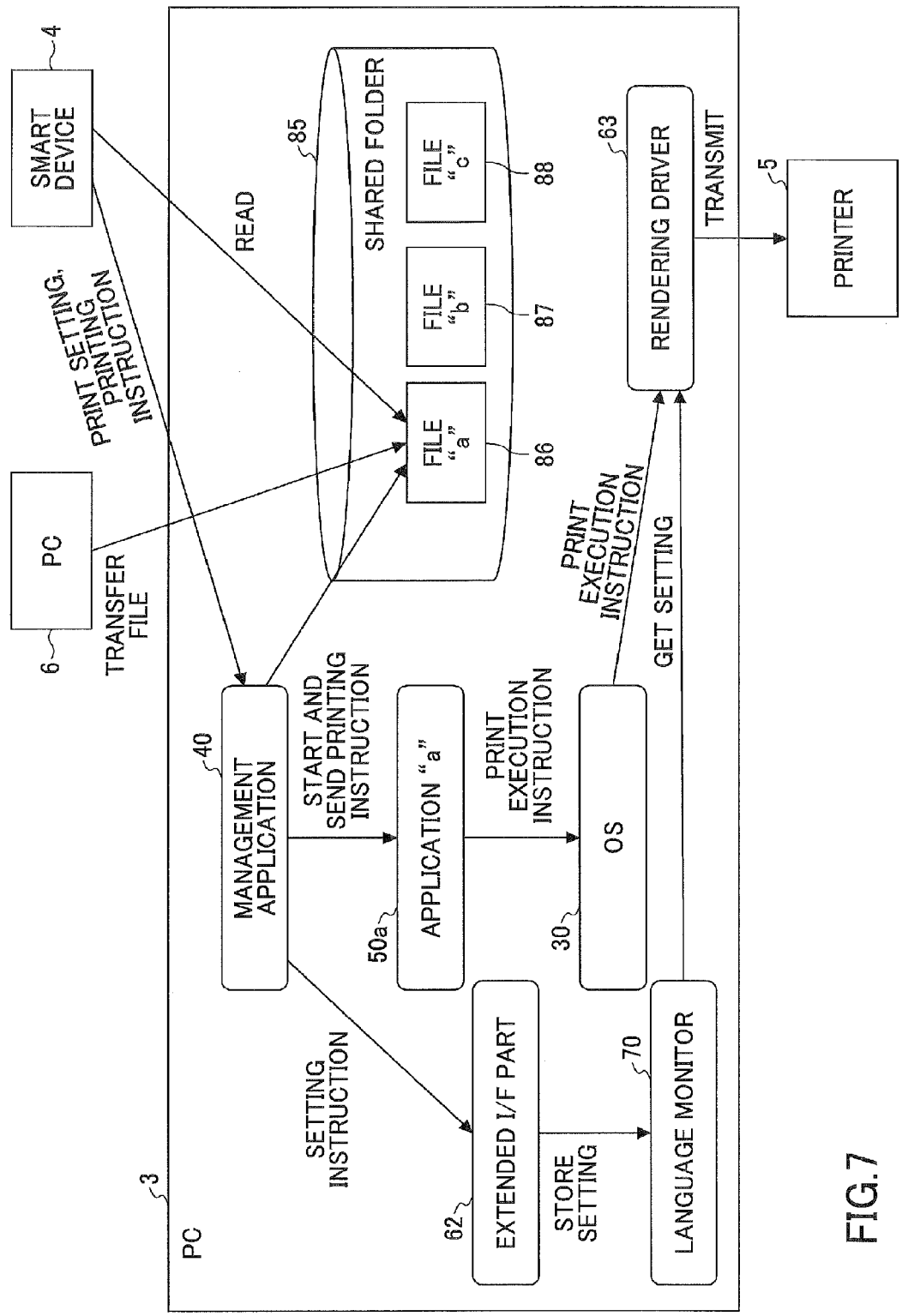
FIG. 7 illustrates a first example of printing by using the IT-BOX technology.

FIG. 7 illustrates a first example of printing by using the IT-BOX technology.

The smart device 4 and the PC 6 as other information processing apparatuses can access the shared folder 85 that is in the PC 3. The PC 6 transfers document files to the shared folder 85. The smart device 4 reads the document files stored in the shared folder 85, selects one of the document files to be printed, and outputs the corresponding printing instruction to the management application 40 while designating the selected document file. At this time, the smart device 4 can set the print settings.

Note that, in FIG. 7, the PC 6 transfers the file "a" 86, and the smart device 4 selects the file "a" 86. However, the smart device 4 can also select other files (the file "b" 87 and the file "c" 88). Also, the PC 6 can select the file to be printed.

After receiving the print settings ("second print setting") ("print setting instruction") from the smart device 4, the management application 40 stores them in the language monitor 70 via the extended I/F part 62. Then, the management application 40 reads the file "a" 86 designated with the printing instruction from the shared folder 85, starts the application "a" 50a which can carry out a printing process of the file "a" 86, and outputs the printing instruction thereto.

The application "a" 50a outputs the corresponding print execution instruction to the OS 30 together with the default print settings ("first print setting") as they are. The OS 30 outputs the corresponding print execution instruction to the rendering driver 63. The rendering driver 63 receives the default print settings DEVMODE ("first print setting") together with the print execution instruction. Next, the rendering driver 63 acquires the print settings ("second print setting") from the language monitor 70. Then, the rendering driver 63 creates the print data reflecting the print settings ("second print setting"), and transmits the print data to the printer 5.

Thus, after designating the file from the shared folder 85 to the management application 40 by using the smart device 4 or the PC 6, setting the print settings ("second print setting") and outputting the printing instruction, it is possible to change the print settings to be actually used from the default print settings ("first print setting") of the application which can carry out a printing process of the designated file to the print settings ("second print setting").

<Procedure from Setting Print Settings to Generating Print Data in First Example>

Figure 8:
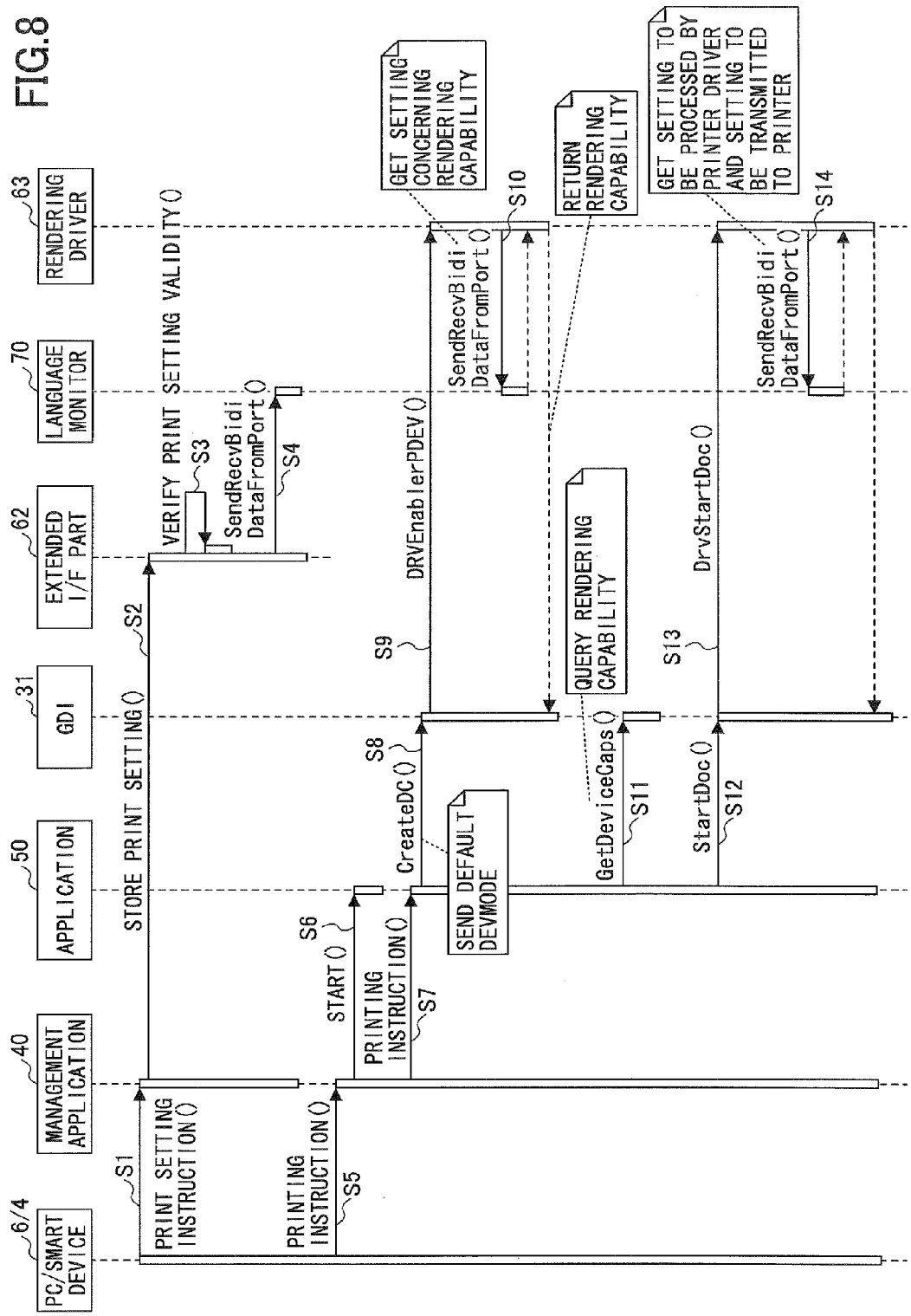
FIG. 8 is a sequence diagram illustrating a procedure from setting the print settings to generating the print data in the first example.

FIG. 8 is a sequence diagram illustrating a procedure from setting the print settings to generating the print data based on the above-mentioned first example.

The PC 6 or the smart device 4 sends (according to the user's operation thereof) a print setting instruction together with the print settings to the management application 40 of the PC 3 (step S1). The management application 40 includes a setting change part, and receives the print settings ("second print setting") after displaying a setting screen page in response to a request from the PC 6 or the smart device 4.

The management application 40 sends a request to store the print settings received from the PC 6 or the smart device 4 to the extended I/F part 62 of the printer driver (step S2). The extended I/F part 62 verifies (determines) the validity of the print settings (step S3), and stores the print settings in the language monitor 70 (step S4).

At this time, the extended I/F part 62 uses an API of the Windows OS, i.e., SendRecvBidiDataFromPort( ). The SendRecvBidiDataFromPort( ) function is an API implemented in the language monitor 70. As same as the printer driver 60, also the language monitor 70 has I/Fs determined by the Windows OS. The SendRecvBidiDataFromPort( ) function is one thereof, and supports bidirectional communication between an application and a printer and between an application and a print server.

Next, the PC 6 or the smart device 4 designates (according to the user's operation thereof) a document file and sends the corresponding printing instruction to the management application 40 of the PC 3 (step S5). The management application 40 starts the application 50 that can carry out a printing process of the designated document file (step S6), and outputs the corresponding printing instruction thereto (step S7).

The application 50 sends the corresponding print execution instruction and the DEVMODE structure storing the default print settings ("first print setting") to the GDI 31 of the OS (step S8). Specifically, the application 50 calls the GDI 31 with a CreateDC( ) function having the default print settings as the argument.

The GDI 31 sends the DEVMODE structure storing the default print settings ("first print setting") to the rendering driver 63 (step S9). Specifically, the print settings (the DEVMODE structure) thus sent as the argument of CreateDC( ) by the application 50 to the GDI 31 is then sent to the rendering driver 63 in such a form that they ("first print setting") are stored as the argument of DrvEnablePDEV( ).

The rendering driver 63 needs to return the rendering capability in response to this printing start preparation instruction (DrvEnablePDEV( ). Therefore, the rendering driver 63 acquires the print settings that ("second print setting") are set by the extended I/F part 62 from the language monitor 70 (step S10). Specifically, a value indicating a query is set in the argument of SendRecvBidiDataFromPort( ) which is then sent to the language monitor 70. If the language monitor 70 has the print settings ("second print setting") that are set by the extended I/F part 62, the language monitor 70 sets them in SendRecvBidiDataFromPort( ) and returns them ("second print setting") to the rendering driver 63.

Next, the rendering driver 63 merges the print settings ("second print setting") thus acquired from the language monitor 70 with the print settings ("first print setting") received together with the printing start preparation instruction, and returns the rendering capability to the GDI 31.

The application 50 queries the GDI 31 about the rendering capability (step S11:GetDeviceCaps( )). Next, the application 50 sends an instruction to start printing to the GDI 31 (step S12). Specifically, the application 50 calls the GDI 31 with a StartDoc( ) function having DocINFO or so as the argument. The GDI 31 sends a printing start instruction to the rendering driver 63 (step S13). Specifically, the GDI 31 sends a DrvStartDoc( ) function to the rendering driver 63.

After receiving the printing start instruction (DrvStartDoc( )) from the GDI 31, the rendering driver 63 acquires, from the language monitor 70, the print settings ("second print setting") to be reflected in the printer driver 60 ("N in 1", color balance, and/or the like) and/or the print settings ("second print setting") to be reflected in the printer body (duplex, stapling, and/or the like) (step S14). Note that, in an actual printing process, the validity of the final settings is verified thereafter.

The rendering driver 63 generates the print data (PJL and PDL) based on the print settings ("second print setting") acquired from the language monitor 70, and transmits the print data to the printer 5.

<Printing System Having Point & Print Environment>

Figure 9:
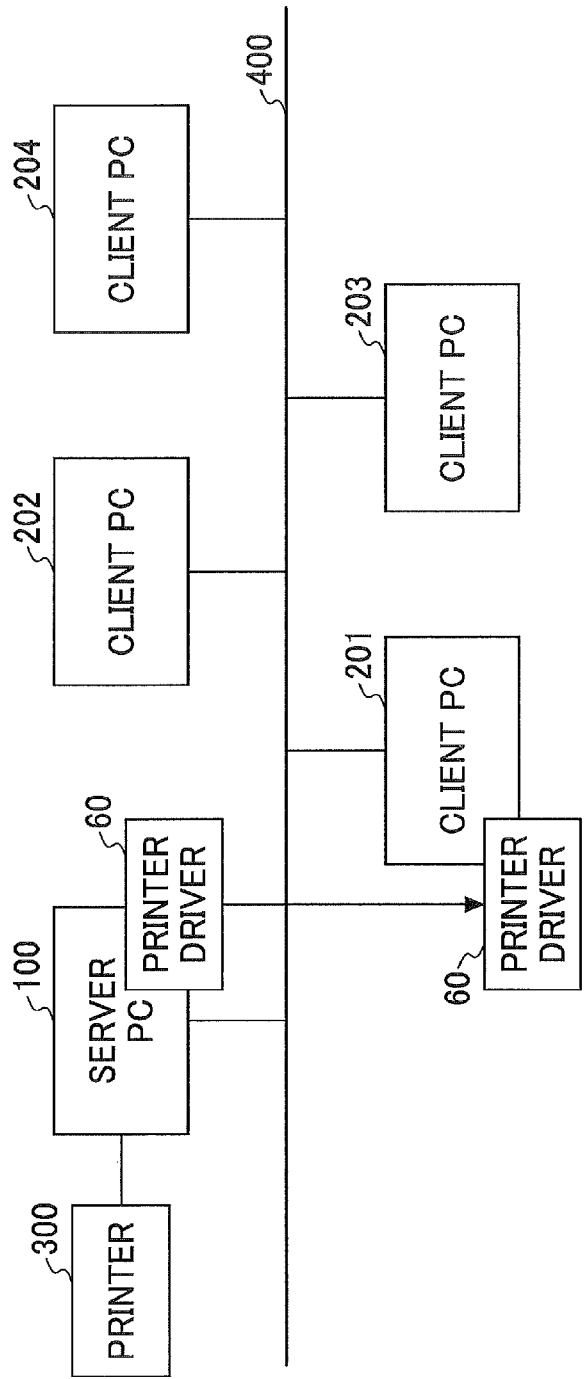
FIG. 9 illustrates a printing system having the Point & Print environment.

FIG. 9 illustrates a printing system having the Point & Print environment. In this printing system, four client PCs 201 to 204 are connected to a server PC 100 via a communication network 400. To the server PC 100, a printer 300 is connected. However, it is also possible that the printer 300 is connected to the communication network 400.

In the server PC 100, a printer driver 60 is installed. The server PC 100 copies the printer driver 60 and distributes the thus acquired copies to the client PCs 201 to 204, respectively. Thus, without the need of the user's operation, the server PC 100 and the client PCs 201 to 204 can cooperatively install the printer drivers 60. Note that, hereinafter, it is assumed that the client PC 201 is connected to the server PC 100, and, the client PC 201 installs the printer driver 60 according to the Point & Print technology. In this case, the client PC 201 and the server PC 100 constitute an information processing system.

In "server-side rendering" in the Point & Print environment, the client PC 201 receives the print settings that are input by the user, whereas the server PC 100 carries out the rendering. Therefore, it may be difficult to share the print settings and so forth therebetween.

However, the above-described language monitor 70 is a function inside the Windows OS. Therefore, the Windows OS of the client PC 201 where the printer driver 60 is installed according to the Point & Print technology can transmit the print settings to the server PC 100. Thus, the server PC 100 can acquire the print settings from the client PC 201 through a process inside the print architecture.

<Language Monitor in Point & Print Environment>

Figure 10:
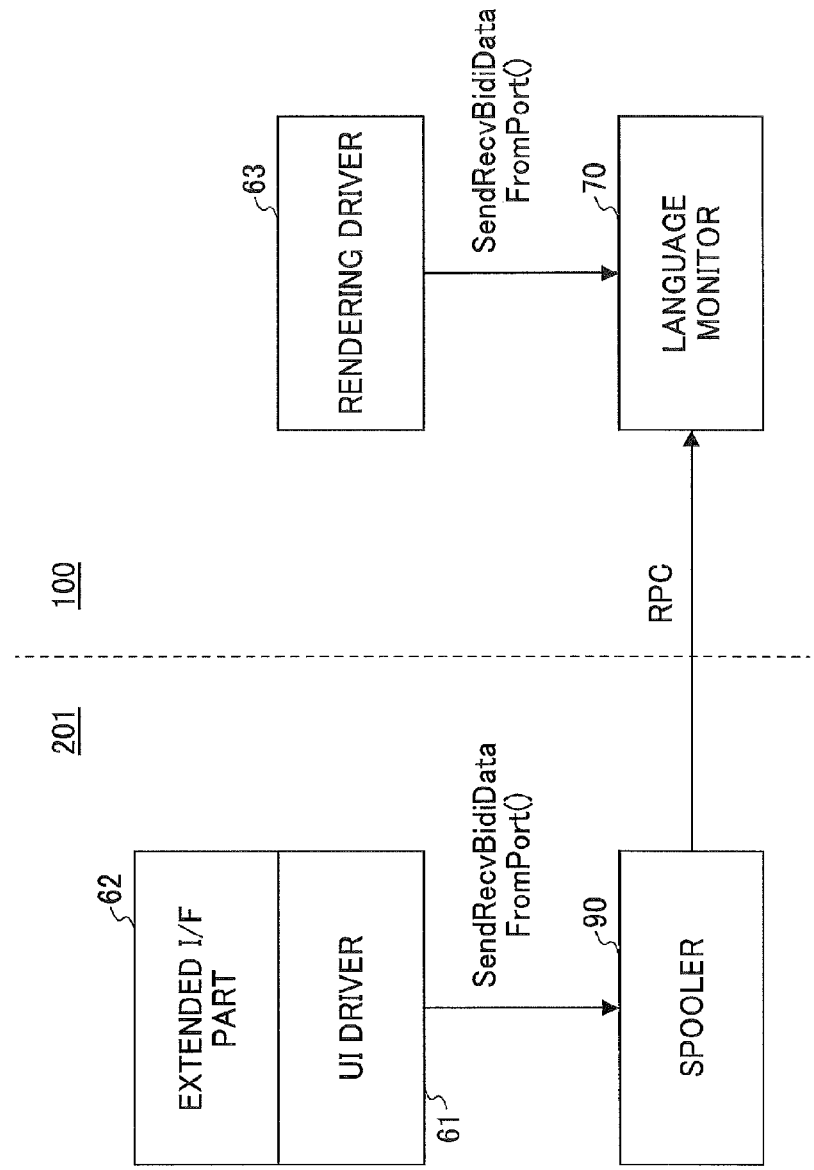
FIG. 10 illustrates a language monitor in the Point & Print environment.

FIG. 10 illustrates the operations of the language monitor in the Point & Print environment.

As described above, the language monitor 70 is one module incorporated into the print architecture of the Windows OS. Therefore, even if the client PC 201 plays a roll of processes of the UI driver 61 and the extended I/F part 62 while the server PC 100 plays a roll of a process of the rendering driver 63 in the Point & Print environment, the single language monitor 70 works only in the server PC 100. Although also the client PC 201 has the language monitor, the language monitor in the client PC 201 does not work in this case.

The printer driver in the client PC 201 and the printer driver in the server PC 100 access the single the language monitor 70. The OS in the client PC 201 and the OS in the server PC 100 establish communication between the client PC 201 and the server PC 100 (for example, by using Remote Procedure Call (RPC)). Then, in a case where the UI driver 61 is to access the language monitor of the client PC 201, the language monitor in the client PC 201 does not work, and the spooler 90 transmits the print settings to the language monitor 70 of the server PC 100.

Thus, because the client PC 201 and the server PC 100 install the same Windows OSs, the client PC 201 and the server PC 100 can use the language monitor of the print architecture of the Windows OS in a sharing manner. Therefore, access disablement, communication error, or so, which is likely to occur due to a difference in access authority in a module originally developed by a manufacturer, is not likely to occur. In the same reason, the affinity with the Windows OS is high in this configuration.

<Second Example of Printing by Using IT-BOX>

The first example described above using FIG. 7 relates to the method of changing the print settings for each job, and carrying out the printing. Therefore, for example, a case where the management application 40 prints files from the shared folder 85 collectively at a specific time is not considered. A second example that will now be described relates to a method of, even in such a case, changing the print settings for each specific unit (for each specific job, application, user, or so), and carrying out the printing.

Figure 11:
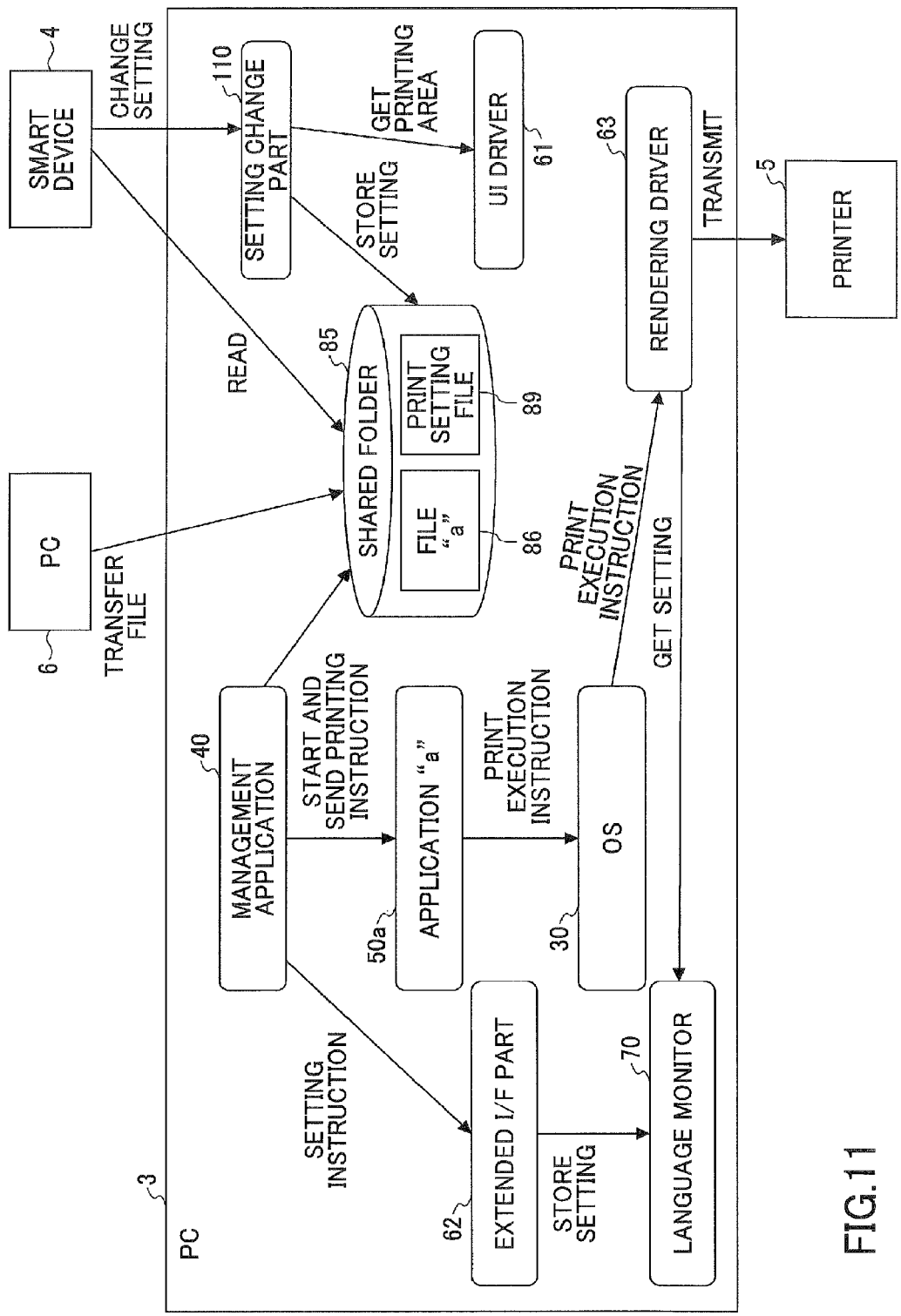
FIG. 11 illustrates a second example of printing by using the IT-BOX technology.

FIG. 11 illustrates the second example of printing by using the IT-BOX technology. In FIG. 11, the same reference numerals are given to the same or corresponding elements as those of FIG. 7 (the first example), and duplicate explanation will be omitted unless it is particularly necessary.

A setting change part 110 receives a print setting change request from an external device (in this example, the smart device 4), and provides an interface for changing the print settings (for example, a print setting change UI of FIG. 12). When providing the interface for changing the print settings, the setting change part 110 receives the printing area of the printer driver from the UI driver 61, shows information concerning the settable items based on the acquired printing area of the printer driver, and receives a setting change instruction (the print settings) through the interface via the smart device 4. After thus receiving the setting change instruction (the print settings) through the interface, the setting change part 110 generates a print setting file 89 based on the print settings that are thus set, and stores the print setting file 89 in the shared folder 85.

Note that, in the print setting file 89, the print settings that are thus set can be stored for each job, for each application, for each user, and/or the like. As a result, by designating a specific application, for example, it is possible to acquire (extract) the corresponding print settings from the print setting file 89.

Then, after receiving a print setting instruction from an external device (the smart device 4 or the PC), the management application 40 reads the print setting file 89 from the shared folder 85, acquires the corresponding print settings from the print setting file 89 based on the information written in the print setting file 89, and sets the thus acquired print settings by using the extended I/F part 62. Then, after receiving a printing instruction from the external device (it is also possible that the printing instruction is generated automatically at a designated time in a way of time-designated printing, or so), the management application 40 starts an application for printing that can carry out a printing process of the designated file (in this example, the application "a" 50a), and sends a printing instruction to the application "a" 50a.

<Example of Print Setting Change UI>

FIG. 12 illustrates one example of a print setting change UI provided by the setting change part 110 shown in FIG. 11.

When the user selects "for each application" from among the respective options of "for each application", "for each job", "for each user", and so forth, in the selection input frame 501 on a print setting screen page 500 (the print setting change UI) shown in FIG. 12, and inputs "AdobeReader" as the "application name" in the application name input frame 502, the print setting "AdobeReader" is stored. Note that, although the print setting change UI such as the print setting screen page 500 of the printer driver has been thus illustrated, the configuration of the print setting change UI is not limited thereto.

<Procedure from Setting Print Settings to Generating Print Data in Second Example>

FIG. 13 is a sequence diagram illustrating a procedure from setting the print settings to generating the print data based on the above-mentioned second example.

In FIG. 13, it is assumed that the print settings are changed "for each application", for example.

First, the PC 6 or the smart device 4 sends a print setting change request (step S21) (according to the user's operation thereof). The setting change part 110 acquires the capability of the printer driver 60 from the UI driver 61 (step S22), starts print setting change UI, and provides it to the PC 6 or the smart device 4 (step S23).

The PC 6 or the smart device 4 designates (according to the user's operation thereof), through the print setting change UI displayed thereon, the application to set ("application for printing"), and thus, changes the print settings (step S24). The setting change part 110 stores the thus changed print settings in a form of the print setting file 89 in the shared folder 85 (step S25).

As mentioned above, in the print setting file 89, the print settings that are thus set can be stored for each application. As a result, by designating a specific application ("application for printing"), it is possible to acquire (extract) the corresponding print settings from the print setting file 89.

Next, the PC 6 or the smart device 4 sends, to the management application 40, a printing instruction (step S26). The management application 40 acquires, from the shared folder, the print setting file 89 (step S27), and, from the print setting file 89, determines (extracts therefrom) the printing settings corresponding to the "application for printing" (step S28).

Note that, because the printing instruction of step S26 includes the designation of the document file to be printed, the management application 40 can determine the "application for printing" therefrom. For example, if the document file to be printed is a PDF file, the management application 40 can determine the "application for printing" as "AdobeReader" accordingly, and determine (extract) the corresponding print settings from the print setting file 89 in step S28.

Next, the management application 40 sends, to the extended I/F part 62, a request to store the printing settings of the "application for the printing" (step S29). The extended I/F part 62 verifies (determines) the validity of the print settings (step S30), and stores them in the language monitor 70 (step S31). Steps S32, S33, S34, S35, S36, S37, S38, S39 and S40 thereafter are the same as S6, S7, S8, S9, S10, S11, S12, S13 and S14 of FIG. 8 (the first example), respectively, and duplicate explanations thereof will be omitted.

Note that, according to a sequence for a case where the print settings are changed "for each user", the PC 6 or the smart device 4 designates a user to set through the print setting change UI in step S24 in the same way, and adds the corresponding user ID to the printing instruction in step S26. Then, the management application 40 determines (extracts) the thus designated user's print settings according to the user ID in the same way in step S28.

<Switching Printer Driver from Among Those Supporting Different Functions>

Figure 14:
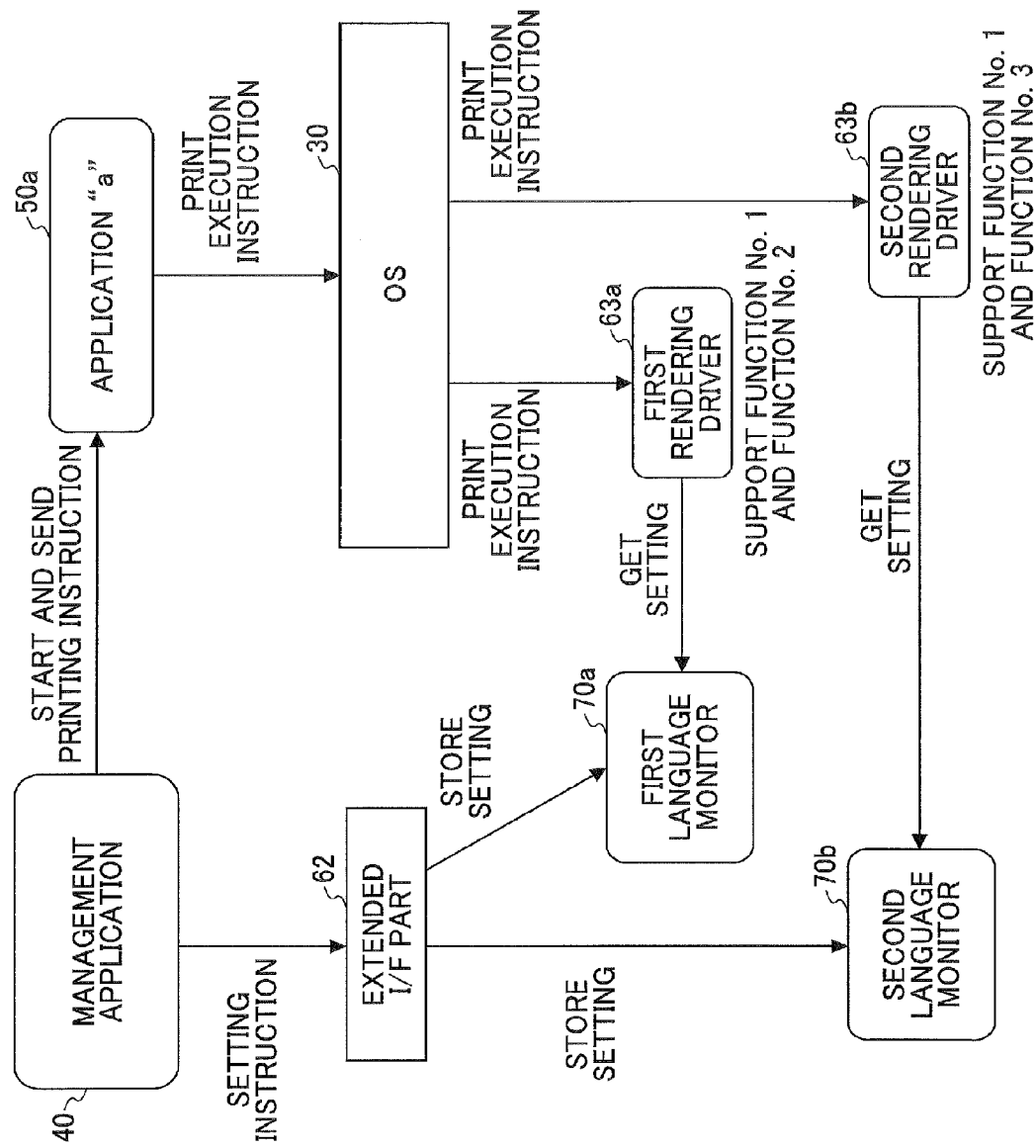
FIG. 14 illustrates a case of switching a printer driver among a plurality of printer drivers which support different functions.

FIG. 14 illustrates a case of switching a printer driver among a plurality of printer drivers which support different functions.

In this example, it is assumed that a first printer driver supporting a function No. 1 and a function No. 2, and a second printer driver supporting the function No. 1 and a function No. 3 are provided.

A first rendering driver 63*a* and a second rendering driver 63*b* are included in respective packages of the first printer driver and the second printer driver. The packages of the first printer driver and the second printer driver include also, extended I/F parts, respectively. However, these extended I/F parts are modules having the same names of the same versions or updated versions. Therefore, after these two printer drivers are installed, these extended I/F parts are overwritten by the extended I/F parts of the new versions, and thus, the only single extended I/F part is present. The single extended I/F part 62 stores, in a first the language monitor 70*a* and a second the language monitor 70*b*, the corresponding sets of the print settings to be used, respectively, when the first printer driver and the second printer driver work. The first rendering driver 63*a* and the second rendering driver 63*b* acquire the respective sets of the print settings from the first the language monitor 70*a* and the second the language monitor 70*b*.

<Procedure of Selecting One from Among Printer Drivers Supporting Different Functions>

Figure 15:
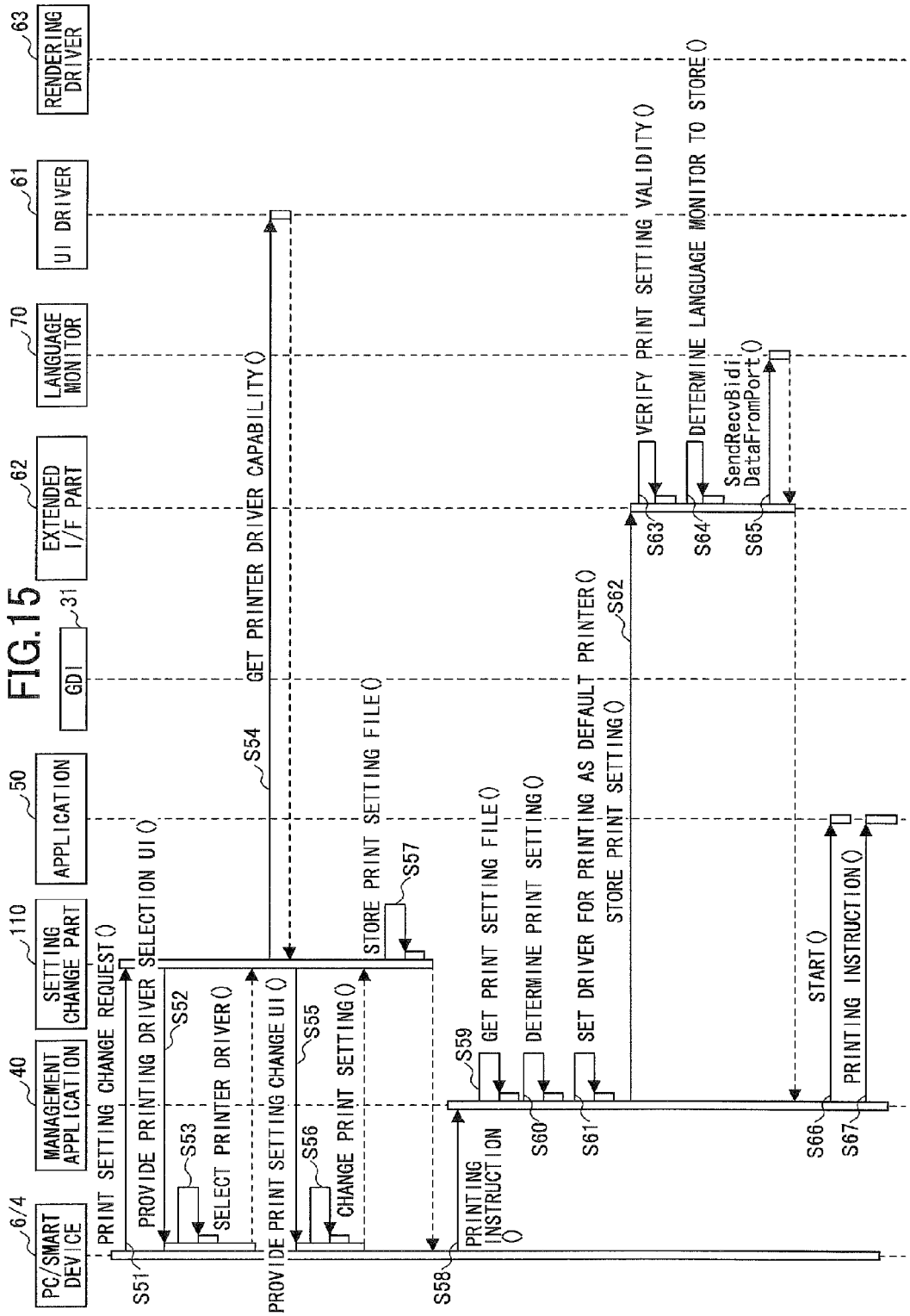
FIG. 15 is a sequence diagram illustrating a procedure of printing after selecting one of the printer drivers which support the different functions.

FIG. 15 is a sequence diagram illustrating a procedure of printing after selecting one of the printer drivers which support the different functions.

First, the PC 6 or the smart device 4 sends (according to the user's operation thereof) a print setting change request to the setting change part 110 of the PC 3 (step S51). The setting change part 110 provides a printer driver selection UI to the PC 6 or the smart device 4, and requests to select a printer driver (step S52).

After the PC 6 or the smart device 4 selects (according to the user's operation thereof) a printer driver ("printer driver for printing") (step S53), the setting change part 110 acquires the capability of the printer driver from the UI driver 61 of the thus selected printer driver (i.e., a "printer driver for printing") (step S54). In this example, it is assumed that the first printer driver is selected.

Next, the setting change part 110 provides, to the PC 6 or the smart device 4, a print setting change UI according to the thus acquired capability of the printer driver (step S55). After the PC 6 or the smart device 4 then designates the application to set and changes the print settings through the print setting change UI (according to the user's operation thereof) (step S56), the setting change part 110 stores the changed print settings in a form of a print setting file in the shared folder 85 (step S57).

Note that the setting change part 110 also includes the information identifying the "printer driver for printing" selected in step S53 in the print setting file stored in the shared folder 85 in step S57.

Next, the PC 6 or the smart device 4 sends, to the management application 40, a printing instruction (according to the user's operation thereof) (step S58). The management application 40 then acquires the print setting file from the shared folder 85 (step S59), and determines (extracts) the print settings for the "application for printing" from the print setting file (step S60).

Next, the management application 40 determines the "printer driver for printing" from the thus-acquired print setting file, and sets the determined printer driver as a "default printer" (step S61). Through this procedure, it is possible to carry out printing by using the printer driver that is thus set as the "default printer".

Next, the management application 40 sends the printer icon name (of the "default printer") and the print settings determined in step S60 to the extended I/F part 62 of the printer drivers, and sends a request to store the print settings thereto (step S62).

The extended I/F part 62 verifies the validity of the print settings (step S63), determines the corresponding language monitor from the printer icon name (step S64), and stores the print settings in the determined language monitor (step S65).

Next, the management application 40 starts the application 50 which can carry out a printing process of the designated document file (designated in step S58) (step S66), and sends a printing instruction thereto (step S67). The printer to be then used for the printing is the "default printer". The procedure to be executed thereafter is the same as steps S8-S14 of FIG. 8, and thus, duplicate illustration and explanation thereof are omitted.

<Extended I/F Part for which Addition/Deletion of Function is Possible>

In the above-described configurations, the extended I/F part 62 is incorporated in the system (i.e., the printer driver) as a single module. Therefore, in order to add or delete a function to or from the extended I/F part 62, the extended I/F part 62 itself needs to be changed and again installed. Thus, certain labor is required.

Figure 16:
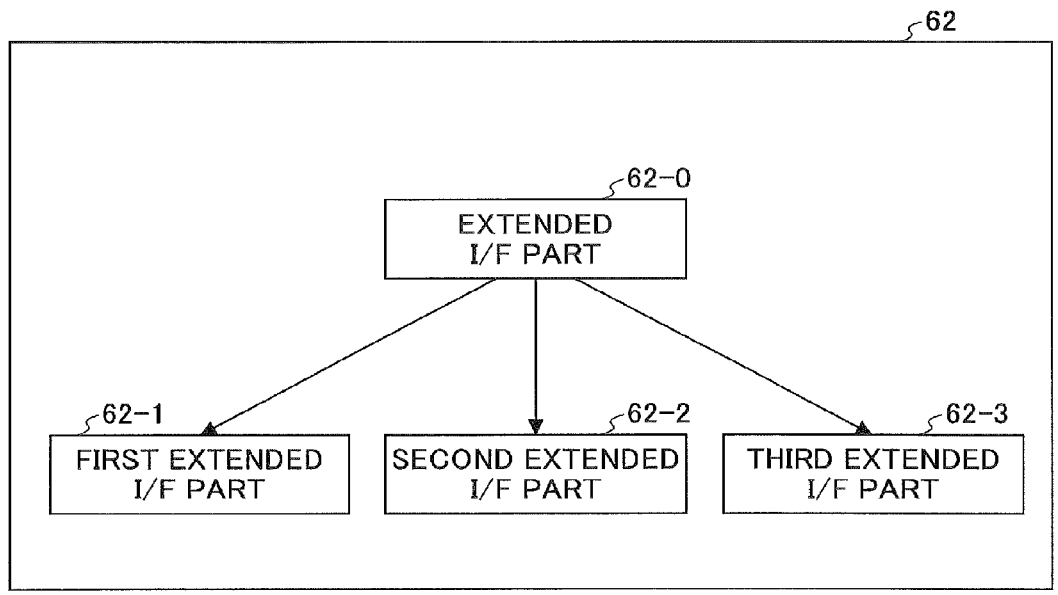
FIG. 16 illustrates an extended I/F part having a function of dynamically incorporating a new function.

In order to improve this point, a function of dynamically incorporating a new function can be provided. Thereby, it becomes possible to easily add a new function to or delete a function from the extended I/F part 62. FIG. 16 illustrates an extended I/F part having such a function of dynamically incorporating a new function.

The extended I/F part 62 includes an extended I/F part 62-0, and first, second and third extended I/F parts 62-1, 62-2 and 62-3 for addition. The first to third extended I/F parts 62-1 to 62-3 are interfaces to be used to set functions corresponding to the above-mentioned functions No. 1, No. 2 and No. 3, for example. The first to third extended I/F parts 62-1 to 62-3 are separate modules that are added each time when the corresponding functions are added, respectively.

Specific examples of "functions" that can be thus set or added by using the interfaces, namely, the first to third extended I/F parts 62-1 to 62-3, and/or the like, will now be described. "Bookbinding", "stapling", "sorting", "N in 1", "change in printing sheet size", and so forth, can be cited as "setting items". In addition to these setting items themselves, "long-edge binding", "short-edge binding", and so forth, concerning the setting item "bookbinding"; "top left", "top right", and so forth, concerning the setting item "stapling"; "return postcard", and so forth, concerning the setting item "change in printing sheet size" can be cited as "setting values".

By thus configuring the first to third extended I/F parts 62-1 to 62-3, and/or the like, the third extended I/F part 62-3, for example, can be appropriately used for a new function (for example, "sorting") merely as a result of the corresponding extended I/F part 62-3 (for example, an interface for displaying a dialog, or so, for a user to input a setting value concerning the setting item "sorting") being added, without the need of newly creating the extended I/F part 62 again, even when the new function is added as a result of a new printer driver being added, for example.

The extended I/F part 62-0 functions as a window for a module such as the management application 40 which requests actually to set the print settings through the extended I/F part 62. In other words, in this case, the module which requests to set the print settings is to request to set the print settings usually through the extended I/F part 62-0.

The extended I/F part 62-0 invokes any one of the first to third extended I/F parts 62-1 to 62-3 according to a predetermined rule. The predetermined rule is, for example, "to invoke all the extended I/F parts included in a folder", "to read a file that shows a path to the extended I/F part(s) to invoke, and invoke the extended I/F part(s) according to the path", or so.

By previously determining the predetermined rule as "to invoke the first extended I/F part and the second extended I/F part for the first printer driver and invoke the first extended I/F part and the third extended I/F part for the second printer driver", the first extended I/F part 62-1 and the second extended I/F part 62-2 are invoked for the first printer driver, whereas the first extended I/F part 62-1 and the third extended I/F part 62-3 are invoked for the second printer driver.

Note that, as mentioned above, the first rendering driver 63a and the second rendering driver 63b are included in the respective packages of the first printer driver and the second printer driver. Therefore, above-mentioned "for the first printer driver" can also mean "for the first rendering driver 63a" and "for the second printer driver" can also mean "for the second rendering driver 63b".

Note that all of the extended I/F part 62-0 and the first to third extended I/F parts 62-1 to 62-3 have the same interfaces (functions). The interface is, for example, as follows:

```
bool setPrintSetting(
    char* printer_icon,
    char* pirntSetting,
)
```

This example is an interface for setting the printer icon name in the first argument and a printer setting list in the second argument. Each of the first to third extended I/F part 62-1 to 62-3 invoked according to the above-mentioned rule extracts the print settings relevant to itself from the print setting list that is set in the second argument, verifies the validity of the extracted print settings and stores the print settings in the language monitor.

Thus, in this example, the extended I/F part 62-0 functioning as the window for the module which requests to set the print settings and the extended I/F parts 62-1 to 62-3 to be used to add the new functions have the same interfaces, as mentioned above. Thereby, it is possible to add a new function "A" only by creating the corresponding extended I/F part 62-"A" and placing the extended I/F part 62-"A" at a position according to the rule which is used to invoke the extended I/F part 62-"A" through the extended I/F part 62-0.

<UI for Adding Extended I/F Part>

It is also possible to implement adding the extended I/F part 62-"A" for a new function "A" in such a manner as to provide a UI therefor, and the user performs an operation or inputs an instruction to the UI.

Figure 17:
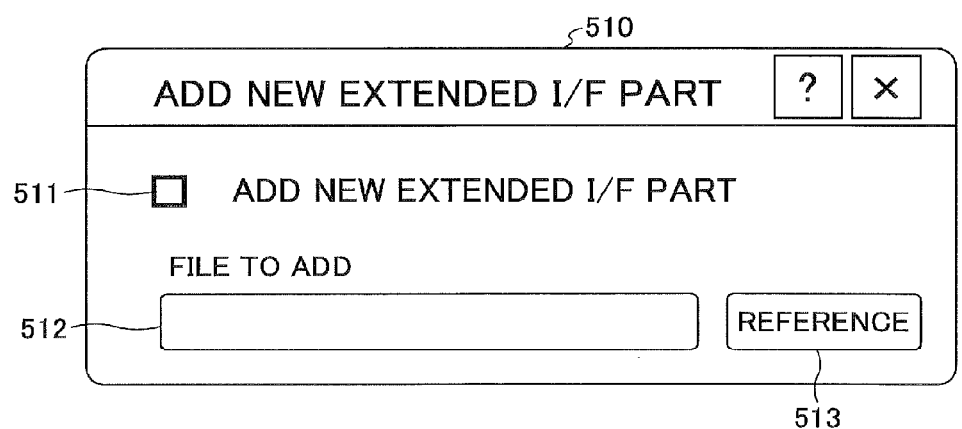
FIG. 17 illustrates a UI for adding the extended I/F part for a new function.

FIG. 17 illustrates a UI for adding the extended I/F part 62-"A" for a new function "A". The user can add the extended I/F part 62-"A" for a new function "A" by checking the check box 511 "add new extended I/F part" on the UI screen page shown in FIG. 17, and directly inputting the corresponding extended I/F part in the input frame 512 "file to add" or selecting the corresponding extended I/F part from among those that are displayed as a result of pressing/clicking the button 513 "reference".

According to the embodiments described above, generally, it is possible to change the print settings of the application that outputs the print execution instruction to the operating system without modifying the application and without the need of the user's operation of the print setting screen page.

Furthermore, as described above, the embodiments provide at least the following advantageous effects (1) to (6):

(1) The printer driver 60 has, in addition to the DDI defined by the OS 30, the unique extended I/F part 62. It is possible to receive a request to change the print settings through the extended I/F part 62. Therefore, it is possible to change the default print settings of the application 50 into the print settings that the user desires without modifying the application 50 that carries out the printing process and without performing operation or inputting an instruction to the print setting screen page.

(2) The rendering driver 63 can generate the rendering capability information to be returned to the GDI 31 based on the print settings that are input by the user, received by the extended I/F part 62 and stored in the language monitor 70. Therefore, the application 50 carrying out the printing process can output a rendering instruction using the maximum available rendering capability based on the print settings that are input by the user and the capability information of the printer 5.

(3) The print settings that are input by the user and received by the extended I/F part 62 are stored in the language monitor 70 that is a module incorporated into the print architecture of the Windows OS. As a result, it is possible to implement the printing process in any one of the RAW spooling type and the EMF spooling type according to the print settings that are input by the user and received by the extended I/F part 62.

(4) The print settings that are input by the user and received by the extended I/F part 62 are stored in the language monitor 70 that is a module incorporated into the print architecture of the Windows OS. As a result, it is possible to implement the printing process by the printer driver 60 installed according to the Point & Print technology in the print settings that are input by the user and received by the extended I/F part 62 without regard to the spooling type.

(5) The print settings to be stored in the language monitor 70 can be changed from an external device such as the smart device 4 or the PC 6 for each predetermined unit (job unit, application unit, user unit, or so). Therefore, by previously storing the print settings for each predetermined unit, a work to change the print settings for each job is not needed.

(6) The extended I/F part can have the function of dynamically incorporating a new function into the system. Therefore, it is possible to easily add or delete a new function to/from the extended I/F part.

The information processing apparatuses, the information processing systems and the non-transitory computer-readable information recording media storing therein the processor-executable programs have been described above in the embodiments. However, the present invention is not limited to such particular embodiments, and variations and modifications may be made without departing from the scope of the present invention.

The present patent application is based on and claims the benefit of priority of Japanese Priority Application No. 2014-186701 filed on Sep. 12, 2014, the entire contents of which are hereby incorporated herein by reference.

What is claimed is:

1. An information processing apparatus comprising:
a print data generation part that receives, via an operating system, a print execution instruction including a file and a first print setting from an application, and generates print data;
an application management part that sends a printing instruction to the application;
an extended interface part other than an interface part defined by the operating system; and
a print setting storing part that stores a second print setting that is input from the application management part via the extended interface part, wherein
the print data generation part changes a print setting to be used to generate the print data from the first print setting to the second print setting.

2. The information processing apparatus as claimed in claim 1, wherein
the print setting storing part uses a bidirectional interface part that is a standard part for the operating system, the bidirectional interface part being used for bidirectional communication between the print data generation part and a printing device that receives the print data from the print data generation part and prints the file.

3. The information processing apparatus as claimed in claim 1, further comprising:
a shared storage area accessible by another information processing apparatus via a communication network, wherein
the application management part outputs the printing instruction to the application which is capable of outputting the print execution instruction concerning the file stored in the shared storage area and designated by the other information processing apparatus.

4. The information processing apparatus as claimed in claim 3, wherein
the application management part outputs the second print setting that is set by the other information processing apparatus to the extended interface part.

5. The information processing apparatus as claimed in claim 3, further comprising:
a monitoring part that detects the file being added to the shared storage area, wherein
the application management part sends the printing instruction concerning the added file to the application that is capable of outputting the print execution instruction concerning the added file.

6. The information processing apparatus as claimed in claim 3, further comprising:
a setting change part that provides an interface for the other information processing apparatus to change, at a predetermined unit, the print setting to be used to generate the print data from the first print setting to the second print setting; and
a plurality of the print setting storing parts, wherein
the extended interface part selects one of the print setting storing parts to store the second print setting that is set via the interface provided by the setting change part.

7. The information processing apparatus as claimed in claim 6, wherein
the extended interface part selects the one of the print setting storing parts to store the second print setting that is set via the interface provided by the setting change part according to logical-printing-device identification information identifying a logical printing device, wherein the logical-printing-device identification information is sent by the application management part to the extended interface part together with the second print setting.

8. The information processing apparatus as claimed in claim 1, further comprising:
a plurality of the print data generation parts, wherein
the extended interface part has an incorporating part that dynamically incorporates a plurality of extended interface parts for setting the separate second print settings, the separate second print settings being used to set respective functions, and
which one of the extended interface parts is invoked is determined based on which one of the print data generation parts is selected.

9. The information processing apparatus as claimed in claim 1, wherein
each of the first print setting and the second print setting includes any one of printing orientation, paper size, the number of sheets of printing, N in 1, duplex, change in size, color balance, stapling, punching and book binding.

10. An information processing system comprising:
a print data generation unit that receives, via an operating system, a print execution instruction including a file and a first print setting from an application, and generates print data;
an application management unit that sends a printing instruction to the application;
an extended interface unit other than an interface unit defined by the operating system; and
a print setting storing unit that stores a second print setting that is input from the application management unit via the extended interface unit, wherein
the print data generation unit changes a print setting to be used to generate the print data from the first print setting to the second print setting.

11. The information processing system as claimed in claim 10, wherein
the print data generation unit and the extended interface unit are installed in separate information processing apparatuses, respectively.

12. The information processing system as claimed in claim 10, wherein
each of the first print setting and the second print setting includes any one of printing orientation, paper size, the number of sheets of printing, N in 1, duplex, change in size, color balance, stapling, punching and book binding.

13. A non-transitory computer-readable information recording medium storing therein a processor-executable program causing one or more processors to function as:
a print data generation part that receives, via an operating system, a print execution instruction including a file and a first print setting from an application, and generates print data;
an application management part that sends a printing instruction to the application;
an extended interface part other than an interface part defined by the operating system; and
a print setting storing part that stores a second print setting that is input from the application management part via the extended interface part, wherein
the print data generation part changes a print setting to be used to generate the print data from the first print setting to the second print setting.

14. The non-transitory computer-readable information recording medium as claimed in claim 13, wherein
each of the first print setting and the second print setting includes any one of printing orientation, paper size, the number of sheets of printing, N in 1, duplex, change in size, color balance, stapling, punching and book binding.

\* \* \* \* \*